(12) United States Patent
Kondo

(10) Patent No.: US 10,879,961 B2
(45) Date of Patent: *Dec. 29, 2020

(54) MALE CONNECTOR, FEMALE CONNECTOR, AND CONNECTION STRUCTURE OF MALE CONNECTOR AND FEMALE CONNECTOR

(71) Applicant: HOSIDEN CORPORATION, Yao (JP)

(72) Inventor: Hayato Kondo, Yao (JP)

(73) Assignee: HOSIDEN CORPORATION, Yao (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,175

(22) Filed: Apr. 6, 2019

(65) Prior Publication Data

US 2019/0238188 A1    Aug. 1, 2019

Related U.S. Application Data

(62) Division of application No. 14/573,258, filed on Dec. 17, 2014, now Pat. No. 10,305,549.

(30) Foreign Application Priority Data

Dec. 26, 2013 (JP) .................................. 2013-269959
May 12, 2014 (JP) .................................. 2014-98623

(51) Int. Cl.
*H01Q 7/00* (2006.01)
*H04B 5/00* (2006.01)
(Continued)

(52) U.S. Cl.
CPC ........... *H04B 5/0037* (2013.01); *H01F 38/14* (2013.01); *H01Q 1/12* (2013.01); *H01Q 7/00* (2013.01);
(Continued)

(58) Field of Classification Search
CPC .. H02J 50/40; H02J 50/90; H02J 50/05; H02J 50/20; H02J 50/12; H02J 50/10;
(Continued)

(56) References Cited

U.S. PATENT DOCUMENTS 5,455,467 A    10/1995 Young et al.
2002/0102884 A1    8/2002 Pechstein et al.
(Continued)

FOREIGN PATENT DOCUMENTS

CN    201674240 U    12/2010
CN    103348561 A    10/2013
(Continued)

OTHER PUBLICATIONS

Partial European Search Report dated Apr. 24, 2015 for the counterpart European Application No. 14197650.6.
(Continued)

*Primary Examiner* — Awat M Salih
(74) *Attorney, Agent, or Firm* — Kratz, Quintos & Hanson, LLP

(57) ABSTRACT

A male connector includes a male body, a male communication antenna, and a first male circuit board. The male communication antenna is provided inside the male body and is configured to wirelessly communicate a signal. The first male circuit board is electrically connected to the male communication antenna. The invention also provides a female connector including a female body, a female communication antenna, and a first female circuit board. The female communication antenna is provided inside the female body and configured to wirelessly communicate a signal. The first female circuit board is electrically connected to the female communication antenna.

27 Claims, 9 Drawing Sheets

(51) Int. Cl.
*H02J 50/90* (2016.01)
*H02J 50/40* (2016.01)
*H01F 38/14* (2006.01)
*H01Q 1/12* (2006.01)
*H02J 50/10* (2016.01)
*H02J 50/12* (2016.01)
*H02J 50/20* (2016.01)
*H02J 50/05* (2016.01)

(52) U.S. Cl.
CPC .............. *H02J 50/40* (2016.02); *H02J 50/90* (2016.02); *H04B 5/0012* (2013.01); *H04B 5/0031* (2013.01); *H01F 2038/143* (2013.01); *H02J 50/05* (2016.02); *H02J 50/10* (2016.02); *H02J 50/12* (2016.02); *H02J 50/20* (2016.02)

(58) Field of Classification Search
CPC ......... H01Q 1/12; H01F 38/14; H01F 38/143; H04B 5/0037; H04B 5/0012; H04B 5/0031
See application file for complete search history.

(56) References Cited

U.S. PATENT DOCUMENTS

| | | |
|---|---|---|
| 2004/0185901 A1 | 9/2004 | Kachi et al. |
| 2009/0009403 A1 | 1/2009 | Sullivan |
| 2011/0043050 A1 | 2/2011 | Yabe |
| 2012/0009983 A1 | 1/2012 | Mow et al. |
| 2013/0052873 A1* | 2/2013 | Riezebos ............... H01R 24/58 439/620.21 |
| 2014/0054973 A1 | 2/2014 | Asanuma et al. |

FOREIGN PATENT DOCUMENTS

| | | |
|---|---|---|
| GB | 2444295 A | 6/2008 |
| JP | H10-154211 A | 6/1998 |
| JP | 2002-246122 A1 | 8/2002 |
| JP | 2006-303382 A | 11/2006 |
| JP | 2012-105478 A | 5/2012 |
| WO | 2009142053 A1 | 11/2009 |
| WO | 2013053731 A1 | 4/2013 |

OTHER PUBLICATIONS

Extended European Search Report dated Aug. 5, 2015 for the counterpart European Patent Application No. 14197650.6.
Chinese Office Action for counterpart Chinese patent application No. 201410825994.0 dated Aug. 24, 2017 (23 sheets, 11 sheets translation, 34 sheets total).
Notification of Reasons for Refusal for counterpart Japanese application No. 2014-098623 dated Sep. 5, 2017 (4 sheets, 4 Sheets translation, 8 Sheets total).
Notification of Reasons for Refusal for the counterpart Japanese Application No. 2014-098623 dated Apr. 3, 2018 (9 sheets).

* cited by examiner

MALE CONNECTOR, FEMALE CONNECTOR, AND CONNECTION STRUCTURE OF MALE CONNECTOR AND FEMALE CONNECTOR

CROSS-REFERENCE TO RELATED APPLICATIONS

The present application claims priority under 35 U.S.C. § 119 of Japanese Patent Application No. 2013-269959 filed on Dec. 26, 2013 and Japanese Patent Application No. 2014-98623 filed on May 12, 2014, the disclosure of which is expressly incorporated by reference herein in its entity.

BACKGROUND OF THE INVENTION

Technical Field

The invention relates to male connectors, female connectors, and connection structures of male connectors and female connectors.

Background Art

Japanese Unexamined Patent Publication No. 2002-246122 discloses a connection structure of a male connector and a female connector that can transmit signals to each other in a noncontact manner. The male connector includes a body, a transmission device, a reception device, and a light transmissive member. The transmission device and the reception device are provided inside the body, near a front face thereof. The light transmissive member is attached to the front end of the body so as to be located in front of the transmission device and the reception device.

The female connector includes a body having a connection hole, a transmission device, a reception device, a light transmissive member, and a rubber ring. The connection hole of the body of the female connector is adapted to receive the front portion of the male connector. The connection hole of the body has a back face, which is opposed to the front face of the body of the received male connector. The rubber ring is fixed to the opening edge of the connection hole. The rubber ring, interposed between the opening edge of the connection hole of the female connector and the body of the male connector fitting in the connection hole, prevents water (including moisture), dust, dirt, contaminants and/or corrosive substances from adhering to the connection area between the connected connectors. The transmission device and the reception device are provided near the back face inside the body. The light transmissive member is attached toward the back of the connection hole of the body so as to be located in front of the transmission device and the reception device.

SUMMARY OF INVENTION

After long-term use of the male connector and the female connector, the deterioration of the rubber ring or other factor may cause adhesion of water, dust, dirt, contaminants and/or corrosive substances to the connection area of the male and female connectors. Adhesion of water, dust, dirt, contaminants and/or corrosive substances to the light transmissive members of the connectors can degrade communication characteristics of the connectors.

In the above circumstances, the invention provides a male connector, a female connector, and a connection structure of the male connector and the female connector that are suitable for long-term use and less likely to be degraded in communication characteristics even with the adhesion of water, dust, dirt, contaminants and/or corrosive substances.

A male connector according to an aspect of the invention includes a male body, a male communication antenna, and a first male circuit board. The male communication antenna is provided inside the male body and is configured to wirelessly communicate a signal. The first male circuit board is electrically connected to the male communication antenna.

The male connector of this aspect has following technical features. First, the male connector is suitable for long-term use because the male communication antenna is provided inside the male body. Second, the male communication antenna, provided inside the male body, is less likely to deteriorate or corrode due to water (including moisture), dust, dirt, contaminants and/or corrosive substances adhered to the male connector. Therefore, it is possible to reduce the possibility that communication characteristics of the male communication antenna are degraded due to deterioration or corrosion of the male communication antenna.

The male body may include a plurality of outer surface regions, the outer surface regions not overlapping each other. The male communication antenna may be provided inside the male body so as to be located near one of the outer surface regions.

In the male connector of this aspect, the male communication antenna located near one of the outer surface regions can provide improved communication characteristics.

The male connector may further include a male power-reception/transmission antenna and a second male circuit board. The male power-reception/transmission antenna may be provided inside the male body so as to be located near another one of the outer surface regions other than the outer surface region near the male communication antenna. The second male circuit board may be electrically connected to the male power-reception/transmission antenna. The male power-reception/transmission antenna may not be electrically connected to the second male circuit board but to the first male circuit board.

In the male connector of these aspects, the male communication antenna and the male power-reception/transmission antenna are provided near different outer surface regions of the male body. This arrangement can suppress interference with the male power-reception/transmission antenna from noise of the male communication antenna and interference with the male communication antenna from noise of the male power-reception/transmission antenna.

The male connector may include a plurality of male communication antennas and a plurality of first male circuit boards. Each of the first male circuit boards may be electrically connected to at least one of the male communication antennas. The male communication antennas may be provided inside the male body such that at least one of the male communication antennas is provided near one of the outer surface regions and that another at least one of the male communication antennas is provided near another one of the outer surface regions.

In the male connector of this aspect, a male communication antenna or antennas near a certain outer surface region is less likely to receive interference from other male communication antenna or antennas near different outer surface regions.

The male connector may include a plurality of male power-reception/transmission antennas and a plurality of second male circuit boards. Each of the second male circuit boards may be electrically connected to at least one of the male power-reception/transmission antennas. The male power-reception/transmission antennas may be provided inside the male body such that at least one of the male power-reception/transmission antennas is located near another one of the outer surface regions other than the outer surface region near the male communication antenna and that another at least one of the male power-reception/transmission antennas is located near still another one of the outer surface regions other than the outer surface region near the male communication antenna. In the case where a plurality of first male circuit boards are provided, each of the first male circuit boards, not the second circuit boards, may be electrically connected to at least one of the male power-reception/transmission antennas.

The male connector of this aspect can suppress interference with the male power-reception/transmission antennas from noise of the male communication antenna, interference with the male communication antenna from noise of the male power-reception/transmission antennas, and interference with a male power-reception/transmission antenna near a certain outer surface region from other power-reception/transmission antenna or antennas near different outer surface regions.

The male connector may further include a male power-reception/transmission antenna inside the male body, and a second male circuit board electrically connected to the male power-reception/transmission antenna. Alternatively, the male connector may further include a male power-reception/transmission antenna inside the male body, the male power-reception/transmission antenna being electrically connected to the first male circuit board.

The male body may be made of an insulating resin. The male communication antenna and the first male circuit board may be integrally embedded inside the male body by insert-molding.

The male connector of this aspect can prevent water (including moisture), dust, dirt, contaminants and/or corrosive substances from adhering to the male communication antenna(s), preventing deterioration or corrosion of the male communication antenna(s).

The male communication antenna, the first male circuit board, the male power-reception/transmission antenna, and the second male circuit board may be integrally embedded inside the male body by insert-molding. Alternatively, the male communication antenna, the male power-reception/transmission antenna, and the first male circuit board may be integrally embedded inside the male body by insert-molding.

In the male connector of these aspects, water (including moisture), dust, dirt, contaminants and/or corrosive substances can be prevented from adhering to the male communication antenna and/or the male power-reception/transmission antenna(s), preventing deterioration or corrosion of the male communication antenna and/or the male power-reception/transmission antenna(s).

The male communication antenna may be provided on the first male circuit board. The first male circuit board may be provided inside the male body so as to be substantially parallel to the outer surface region located near the male communication antenna on the first male circuit board. The male connector of this aspect provides improved communication characteristics of the male communication antenna.

The male communication antenna may be a conductor formed on the first male circuit board. The male connector of this aspect can be fabricated with a reduced number of components. The male power-reception/transmission antenna may be a conductor formed on the first male circuit board or on the second male circuit board. The male connector of this aspect can be fabricated with a reduced number of components.

The male body may have a plurality of outer surfaces serving as the outer surface regions. Alternatively, the male body may have an outer surface including the outer surface regions.

The female connector according to an aspect of the invention includes a female body, a female communication antenna, and a first female circuit board. The female communication antenna is provided inside the female body and configured to wirelessly communicate a signal. The first female circuit board is electrically connected to the female communication antenna.

The female connector of this aspect has following technical features. First, the female connector is suitable for long-term use because the female communication antenna is provided inside the female body. Second, the female communication antenna, provided inside the female body, is less likely to deteriorate or corrode due to water (including moisture), dust, dirt, contaminants and/or corrosive substances adhered to the female connector. Therefore, it is possible to reduce the possibility that communication characteristics of the female communication antenna are degraded due to deterioration or corrosion of the female communication antenna.

The female body may further include a plurality of wall regions of the connection hole, the wall regions not overlapping each other. The female communication antenna may be provided inside the female body so as to be located near one of the wall regions.

In the female connector of this aspect, the female communication antenna located near one of the wall regions can provide improved communication characteristics.

The female connector may further include a female power-transmission/reception antenna and a second female circuit board. The female power-transmission/reception antenna may be provided inside the female body so as to be located near another one of the wall regions other than the wall region near the female communication antenna. The second female circuit board may be electrically connected to the female power-transmission/reception antenna. The female power-transmission/reception antenna may not be electrically connected to the second female circuit board but to the first female circuit board.

In the female connector of these aspects, the female communication antenna and the female power-transmission/reception antenna are provided near different wall regions of the female body. This arrangement can suppress interference with the female power-transmission/reception antenna from noise of the female communication antenna and interference with the female communication antenna from noise of the female power-transmission/reception antenna.

The female connector may include a plurality of female communication antennas and a plurality of first female circuit boards. Each of the first female circuit boards may be electrically connected to at least one of the female communication antennas. The female communication antennas may be provided inside the female body such that at least one of the female communication antennas is provided near one of the wall regions and that another at least one of the female communication antennas is provided near another one of the wall regions.

In the female connector of this aspect, a female communication antenna or antennas near a certain wall region is less likely to receive interference from other female communication antenna or antennas near different wall regions.

The female connector may include a plurality of female power-transmission/reception antennas and a plurality of second female circuit boards. Each of the second female circuit boards may be electrically connected to at least one of the female power-transmission/reception antenna. The female power-transmission/reception antennas may be provided inside the female body such that at least one of the female power-transmission/reception antennas is located near another one of the wall regions other than the wall region near the female communication antenna and that another at least one of the female power-transmission/reception antennas is located near still another one of the wall regions other than the wall region near the female communication antenna. In the case where a plurality of first female circuit boards is provided, each of the first female circuit boards, not the second female circuit boards, may be electrically connected to at least one of the female power-transmission/reception antennas.

The female connector of this aspect, the female communication antenna or at least one female power-transmission/reception antenna can suppress interference with the female power-transmission/reception antennas from noise of the female communication antenna, interference with the female communication antenna from noise of the female power-transmission/reception antennas, and interference with a female power-transmission/reception antenna near a certain wall region from other female power-transmission/reception antenna or antennas near different wall regions.

The female connector may further include a female power-transmission/reception antenna inside the female body, and a second female circuit board electrically connected to the female power-transmission/reception antenna. Alternatively, the female connector may further include a female power-transmission/reception antenna inside the female body, the female power-transmission/reception antenna being electrically connected to the first female circuit board.

The female body may be made of an insulating resin. The female communication antenna and the first female circuit board may be integrally embedded inside the female body by insert-molding.

The female connector of this aspect can prevent water (including moisture), dust, dirt, contaminants and/or corrosive substances from adhering to the female communication antenna(s), preventing deterioration or corrosion of the female communication antenna(s).

The female communication antenna, the first female circuit board, the female power-transmission/reception antenna, and the second female circuit board may be integrally embedded inside the female body by insert-molding. Alternatively, the female communication antenna, the female power-transmission/reception antenna, and the first female circuit board may be integrally embedded inside the female body by insert-molding.

The female connector of these aspects can prevent water (including moisture), dust, dirt, contaminants and/or corrosive substances from adhering to the female communication antenna and/or the female power-transmission/reception antenna(s), preventing deterioration or corrosion of the female communication antenna and/or the female power-transmission/reception antenna(s).

The female communication antenna may be provided on the first female circuit board. The first female circuit board may be provided inside the female body so as to be substantially parallel to the wall region located near the female communication antenna on the first female circuit board.

The female communication antenna may be a conductor formed on the first female circuit board. The female connector of this aspect can be fabricated with a reduced number of components. The female power-transmission/reception antenna may be a conductor formed on the first female circuit board or on the second female circuit board. The female connector of this aspect can be fabricated with a reduced number of components.

The connection hole of the female body may have a plurality of walls serving as the wall regions. Alternatively, the connection hole of the female body may have a wall including the wall regions.

An aspect of the connection structure of a male connector and a female connector of the invention includes a female connector and a male connector. The female connector includes a female body having a connection hole, a female communication antenna provided inside the female body, the female communication antenna being configured to wirelessly communicate a signal, and a first female circuit board electrically connected to the female communication antenna. The male connector includes a male body, a male communication antenna provided inside the male body, the male communication antenna being configured to wirelessly communicate a signal, and a first male circuit board electrically connected to the male communication antenna. In the state where the male connector is received in the connection hole of the female connector so as to be fixed in position, the male communication antenna and the female communication antenna are arranged within a range that allows wireless signal communication therebetween.

The connection structure of this aspect has following technical features. First, the connection structure is suitable for long-term use. This is because the female communication antenna is provided inside the female body and the male communication antenna is provided inside the male body. Second, the female and male communication antennas are less likely to deteriorate or corrode due to water (including moisture), dust, dirt, contaminants and/or corrosive substances adhered to the female and male connectors. Therefore, it is possible to reduce the possibility that communication characteristics of the female and male communication antennas are degraded due to deterioration or corrosion of the female and male communication antennas. Third, it is possible to reduce the risk of breakdown of wireless communication between the female and male communication antennas. This is because in the connected state, the female and male communication antennas are arranged within a range that allows wireless signal communication between the female communication antenna and the male communication antenna.

The connection structure may have a following configuration. The female body may further include a plurality of wall regions of the connection hole, and the wall regions may not overlap each other. The female communication antenna may be provided inside the female body so as to be located near one of the wall regions. The male body may have a plurality of outer surface regions, which do not overlap each other. The male communication antenna may be provided inside the male body so as to be located near one of the outer surface regions. In the connected state, the one of the outer surface regions may be opposed to the one of the wall regions, and the male communication antenna and the female communication antenna may be arranged within a range that allows wireless signal communication therebetween.

The connection structure of this aspect has improved communication characteristics between the female communication antenna and the male communication antenna. This is because in the connected state, the outer surface region located near the male communication antenna is opposed to the wall region located near the female communication antenna such that the male communication antenna and the female communication antenna are arranged within a range that allows wireless signal communication therebetween.

The connection structure may have a following configuration. The female connector may further include a female power-transmission/reception antenna and a second female circuit board. The female power-transmission/reception antenna may be provided inside the female body so as to be located near another one of the wall regions other than the wall region near the female communication antenna. The second female circuit board may be electrically connected to the female power-transmission/reception antenna. The male connector may further include a male power-reception/transmission antenna and a second male circuit board. The male power-reception/transmission antenna may be provided inside the male body so as to be located near another one of the outer surface regions other than the outer surface region near the male communication antenna. The second male circuit board may be electrically connected to the male power-reception/transmission antenna. In the connected state, the outer surface region located near the male communication antenna may be opposed to the wall region located near the female communication antenna, the male communication antenna located near the outer surface region and the female communication antenna located near the wall region may be arranged within a range that allows wireless signal communication therebetween, and the male power-reception/transmission antenna and the female power-transmission/reception antenna may be arranged within a range that allows wireless transfer of electric power therebetween.

The connection structure may alternatively have a following configuration. The female power-transmission/reception antenna may be electrically connected to the first female circuit board, not to the second female circuit board. The male power-reception/transmission antenna may be electrically connected to the first male circuit board, not to the second male circuit board.

The connection structure may have a following configuration. The female connector may include a plurality of female communication antennas. The female connector may include a plurality of first female circuit boards. At least one of the female communication antennas may be electrically connected to each of the first female circuit boards. The female communication antennas may be provided inside the female body such that at least one of the female communication antennas is provided near one of the wall regions and that another at least one of the female communication antennas is provided near another one of the wall regions. The male connector may include a plurality of male communication antennas. The male connector may include a plurality of first male circuit boards. At least one of the male communication antennas may be electrically connected to each of the first male circuit boards. The male communication antennas may be provided inside the male body such that at least one of the male communication antennas is provided near one of the outer surface regions and that another at least one of the male communication antennas is provided near another one of the outer surface regions. In the connected state, the outer surface region located near the at least one of the male communication antennas may be opposed to the wall region located near the at least one of the female communication antennas, the outer surface region located near the another at least one of the male communication antennas may be opposed to the wall region located near the another at least one of the female communication antennas, the at least one of the male communication antennas and the at least one of the female communication antennas may be arranged within a range that allows wireless signal communication therebetween, and the another at least one of the male communication antennas and the another at least one of the female communication antennas may be arranged within a range that allows wireless signal communication therebetween.

The connection structure may have a following configuration. The female connector may include a plurality of female power-transmission/reception antennas. The female connector may include a plurality of second female circuit boards. At least one of the female power-transmission/reception antennas may be electrically connected to each of the second female circuit boards. The female power-transmission/reception antennas may be provided inside the female body such that at least one of the female power-transmission/reception antennas is located near another one of the wall regions other than the wall region near the female communication antenna and that another at least one of the female power-transmission/reception antennas is located near still another one of the wall regions other than the wall region near the female communication antenna. The male connector may include a plurality of male power-reception/transmission antennas. The male connector may include a plurality of second male circuit boards. At least one of the male power-reception/transmission antennas may be electrically connected to each of the second male circuit boards. The male power-reception/transmission antennas may be provided inside the male body such that at least one of the male power-reception/transmission antennas is located near another one of the outer surface regions other than the outer surface region near the male communication antenna and that another at least one of the male power-reception/transmission antennas is located near still another one of the outer surface regions other than the outer surface region near the male communication antenna. In the connected state, the outer surface region located near the male communication antenna may be opposed to the wall region located near the female communication antenna, the male communication antenna located near the outer surface region and the female communication antenna located near the wall region may be arranged within a range that allows wireless signal communication therebetween, and each male power-reception/transmission antenna and the associated female power-transmission/reception antenna may be arranged within a range that allows wireless power transfer therebetween.

The connection structure may have a following configuration. In the case where a plurality of first female circuit boards are provided, at least one of the female power-transmission/reception antennas may be connected to each of the first female circuit boards, not to the second female circuit board(s). In the case where a plurality of first male circuit boards are provided, at least one of the male power-reception/transmission antennas may be connected to each of the first male circuit boards, not to the second male circuit board(s).

The connection structure may have a following configuration. The female connector may further include a female power-transmission/reception antenna provided inside the female body and a second female circuit board electrically connected to the female power-transmission/reception antenna. The male connector may further include a male power-reception/transmission antenna provided inside the male body and a second male circuit board electrically connected to the male power-reception/transmission antenna. Alternatively, as another aspect of the connection structure, the female connector may further include a female power-transmission/reception antenna that is provided inside the female body and electrically connected to the first female circuit board. The male connector may further include a male power-reception/transmission antenna that is provided inside the male body and electrically connected to the first male circuit board.

The connection structure may have a following configuration. The female body may be made of an insulating resin. The female communication antenna and the first female circuit board may be integrally embedded inside the female body by insert-molding. The male body may be made of an insulating resin. The male communication antenna and the first male circuit board may be integrally embedded inside the male body by insert-molding.

The connection structure may have a following configuration. The female communication antenna, the first female circuit board, the female power-transmission/reception antenna, and the second female circuit board may be integrally embedded inside the female body by insert-molding. The male communication antenna, the first male circuit board, the male power-reception/transmission antenna, and the second male circuit board may be integrally embedded inside the male body by insert-molding. Alternatively, as another aspect of the connection structure, the female communication antenna, the female power-transmission/reception antenna, and the first female circuit board may be integrally embedded inside the female body by insert-molding. The male communication antenna, the male power-reception/transmission antenna, and the first male circuit board may be integrally embedded inside the male body by insert-molding.

The connection structure may have a following configuration. The female communication antenna may be provided on the first female circuit board. The first female circuit board may be provided inside the female body so as to be substantially parallel to the wall region near the female communication antenna on the first female circuit board. The male communication antenna may be provided on the first male circuit board. The first male circuit board may be provided inside the male body so as to be substantially parallel to the outer surface region near the male communication antenna on the first male circuit board.

The connection structure may have a following configuration. The female communication antenna may be a conductor. The male communication antenna may be a conductor.

The connection structure may have a following configuration. The female power-transmission/reception antenna may be a conductor. The male power-reception/transmission antenna may be a conductor.

BRIEF DESCRIPTION OF DRAWINGS

FIG. 1A is a schematic perspective view of a male connector according to Embodiment 1 of the invention, with the internal structure shown through.

FIG. 3A is a schematic perspective view of a female connector according to Embodiment 1 of the invention, with the internal structure shown through.

DESCRIPTION OF EMBODIMENTS

Figure 1A:
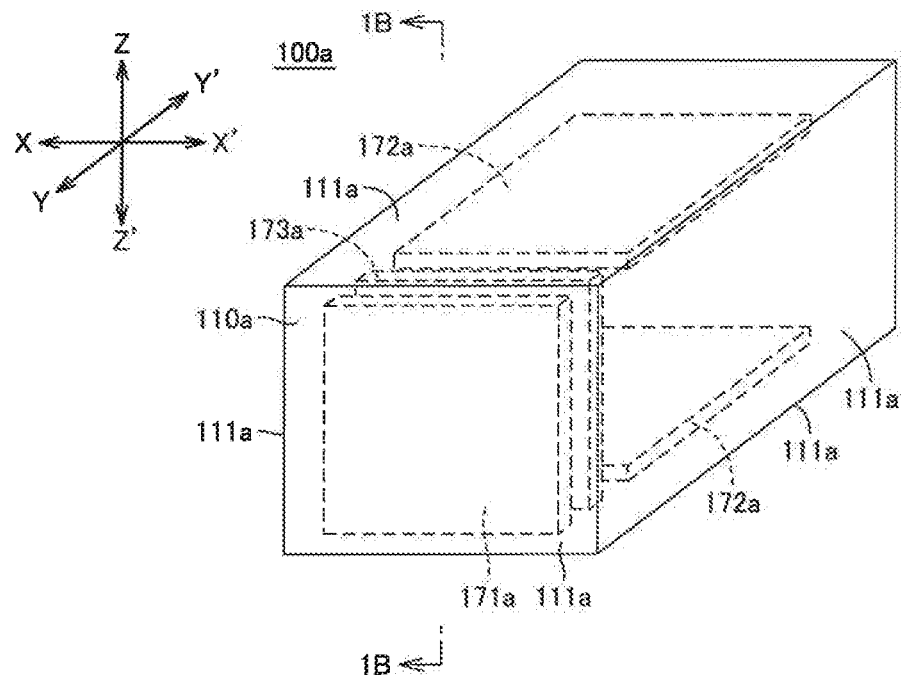

Embodiments 1 to 3 of the invention will be described below.

Embodiment 1

A male connector 100a according to Embodiment 1 of the invention will be described below with reference to FIG. 1A to FIG. 2C. The male connector 100a includes a male body 110a, a male communication antenna 121a, another male communication antenna 122a, a communication circuit 131a, another communication circuit 132a, two male power-reception antennas 140a, two power-reception circuits 150a, a control unit 160a, a first male circuit board 171a, two second male circuit boards 172a, a third male circuit board 173a, and a cable (not shown). These components of the male connector 100a will be described below in detail. The Y-Y' direction shown in FIG. 1A and FIG. 1B corresponds to the lengthwise direction of the male connector 100a and also the insertion/extraction direction of the male connector 100a. The Z-Z' direction shown in FIG. 1A and FIG. 1B corresponds to the height direction of the male connector 100a. The X-X' direction shown in FIG. 1A corresponds to the widthwise direction of the male connector 100a.

Figure 1B:
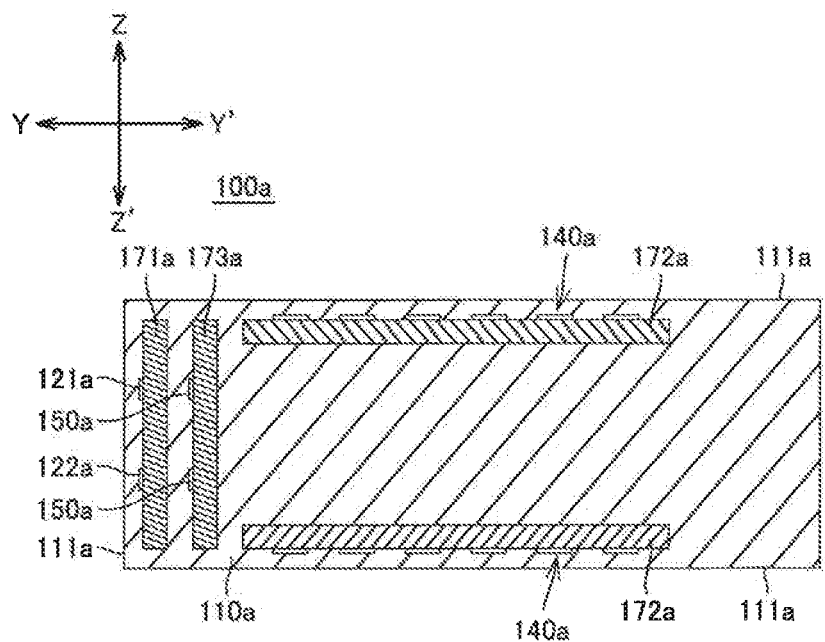
FIG. 1B is a sectional view of the male connector taken along 1B-1B in FIG. 1A.

As shown in FIG. 1A and FIG. 1B, the male body 110a is insulating resin formed in the shape of polyhedron (hexahedron (rectangular parallelepiped) in the case of Embodiment 1) of an insulating resin. The male body 110a is non-translucent (opaque). The male body 110a has a plurality of outer surfaces 111a, namely a front (Y direction-side) surface 111a, an upper (Z direction-side) surface 111a, a lower (Z' direction-side) surface 111a, an X direction-side surface 111a, and an X' direction-side surface 111a. The outer surfaces 111a correspond to non-overlapping outer surface regions of the male body as defined in the claims.

The first male circuit board 171a as shown in FIG. 1A to FIG. 2A is a rigid printed circuit board, a flexible printed circuit board, or a circuit board of polyethylene terephthalate (PET). On the first male circuit board 171a mounted are the male communication antennas 121a and 122a and the communication circuits 131a and 132a. The first male circuit board 171a is integrally embedded inside the male body 110a such that the male communication antennas 121a and 122a are located near (e.g. at a distance in the range of a few millimeters to several tens of millimeters from) the front surface 111a of the male body 110a. In other words, the first male circuit board 171a is integrally embedded inside (covered with) the male body 110a at a point farther from the front surface 111a than the male communication antennas 121a and 122a are, and conversely the male communication antennas 121a and 122a are integrally embedded inside (covered with) the male body 110a at points closer to the front surface 111a than the first male circuit board 171a is. The first male circuit board 171a is oriented substantially in parallel to the front surface 111a.

The male communication antenna 121a is a transmission antenna for wireless signal communication. The male communication antenna 122a is a reception antenna for wireless signal communication. The male communication antennas 121a and 122a may be communication antennas conforming to Ultra Wide Band (UWB), a wireless local area network (WLAN), Bluetooth (registered trademark) or other communication mode. As shown in FIG. 1B to FIG. 2A, the male communication antennas 121a and 122a are conductors formed on and electrically connected to the first male circuit board 171a. For convenience of explanation, FIG. 1B illustrates the male communication antennas 121a and 122a with exaggerated thicknesses. The male communication antennas 121a and 122a are not shown in FIG. 1A.

As shown in FIG. 1B to FIG. 2A, the communication circuit 131a is an integrated circuit (IC) for directing the male communication antenna 121a connected thereto to transmit signals. The communication circuit 132a is a communication IC for directing the male communication antenna 122a connected thereto to receive signals. The communication circuits 131a and 132a, together with the first male circuit board 171a, are integrally embedded inside (covered with) the male body 110a. The communication circuit 131a generates transmission signals on the basis of data received from the control unit 160a, and wirelessly transmits the generated signals as radio signals conforming to a predetermined communication mode to the male communication antenna 121a. When the male communication antenna 122a receives radio signals conforming to the predetermined communication mode, the communication circuit 132a demodulates the received radio signals to reproduce the data and transmits the data to the control unit 160a. Such radio signals conform to a predetermined communication mode, such as UWB, WLAN, and Bluetooth (registered trademark). The communication circuits 131a and 132a are not shown in FIG. 1A.

Figure 2A:
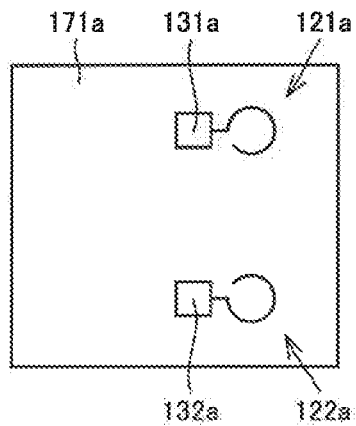
FIG. 2A is a view for the purpose of describing a first male circuit board and male communication antennas of the male connector.
Figure 2B:
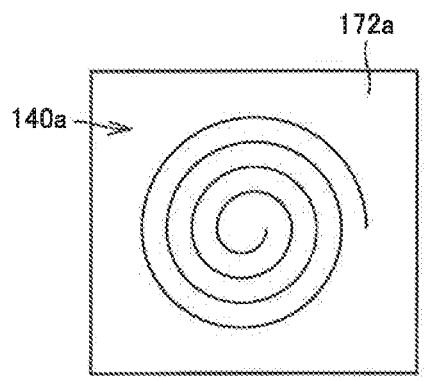
FIG. 2B is a view for the purpose of describing a second male circuit board and a male power-reception antenna of the male connector.

The second male circuit boards 172a as shown in FIG. 1A, FIG. 1B and FIG. 2B are rigid printed circuit boards, flexible printed circuit boards, or PET circuit boards. On one and the other of the second male circuit boards 172a provided are one and the other, respectively, of the male power-reception antennas 140a. The one of the second male circuit boards 172a is integrally embedded inside the male body 110a such that the one of the male power-reception antennas 140a is located near the upper surface 111a of the male body 110a. In other words, the one of the second male circuit board 172a is integrally embedded inside (covered with) the male body 110a at a point farther from the upper surface 111a than the one of the male power-reception antennas 140a is, and conversely the one of the male power-reception antennas 140a is integrally embedded inside (covered with) the male body 110a at a point closer to the upper surface 111a than the one of the second male circuit boards 172a is. The one of the second male circuit boards 172a may be substantially parallel, inclined, or orthogonal relative to the upper surface 111a. The other second male circuit board 172a is integrally embedded inside the male body 110a such that the other male power-reception antenna 140a is located near the lower surface 111a of the male body 110a. In other words, the other second male circuit board 172a is integrally embedded inside (covered with) the male body 110a at a point farther from the lower surface 111a than the other male power-reception antenna 140a is, and conversely the other male power-reception antenna 140a is integrally embedded inside (covered with) the male body 110a at a point closer to the lower surface 111a than the other second male circuit board 172a is. The other second male circuit board 172a may be substantially parallel, inclined, or orthogonal relative to the lower surface 111a.

The male power-reception antennas 140a are secondary antennas for wirelessly receiving electric power via electromagnetic induction, electromagnetic resonance, electric field coupling, or electric wave form. As shown in FIG. 1A to FIG. 1B and FIG. 2B, the male power-reception antennas 140a are conductors respectively formed on and electrically connected to the second male circuit boards 172a (i.e. conductive lines on the second male circuit boards 172a). For convenience of explanation, FIG. 1B illustrates the male power-reception antennas 140a with exaggerated thicknesses. The male power-reception antennas 140a are not shown in FIG. 1A.

Figure 2C:
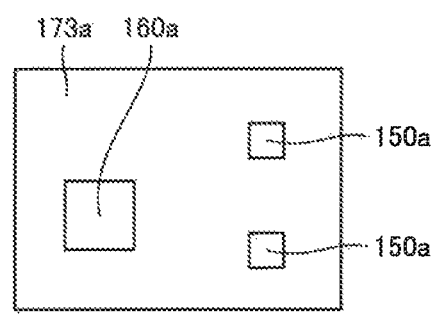
FIG. 2C is a view for the purpose of describing a third male circuit board of the male connector.

As shown in FIG. 1A to FIG. 1B and FIG. 2C, the third male circuit board 173a is a rigid printed circuit board, a flexible printed circuit board, or a PET circuit board. The third male circuit board 173a is integrally embedded inside (covered with) the male body 110a so as to be located behind (on the Y' direction-side of) the first male circuit board 171a. The third male circuit board 173a is connected to the first male circuit board 171a via first connection means (not shown), such as a pin, lead wires, or a flexible printed circuit (FPC). The third male circuit board 173a is connected to the second male circuit boards 172a via second connection means (not shown), such as pins, lead wires, or FPCs.

The power-reception circuits 150a are power-reception ICs for converting energy (e.g. electromagnetic waves) received at the male power-reception antennas 140a into electric power. The power-reception circuits 150a are mounted on the third male circuit board 173a and integrally embedded, together with the third male circuit board 173a, inside (covered with) the male body 110a. One of the power-reception circuit 150a is connected via the associated second connection means to one of the male power-reception antennas 140a mounted on one of the second male circuit board 172a. The other power-reception circuit 150a is connected via the associated second connection means to the other male power-reception antenna 140a mounted on the other second male circuit board 172a. The power-reception circuits 150a are not shown in FIG. 1A.

One of the power receivers (i.e. the power-reception circuit 150a plus the one of the male power-reception antennas 140a) may receive power with the same load as or a different load from the other power receiver (i.e. the power-reception circuit 150a plus the other male power-reception antenna 140a).

The control unit 160a is a microcomputer for controlling the communication circuits 131a and 132a and the power-reception circuits 150a. As shown in FIG. 2C, the control unit 160a is mounted on the third male circuit board 173a and connected to the power-reception circuits 150a. The control unit 160a is also connected to the communication circuits 131a and 132a via the first connection means. The control unit 160a, together with the third male circuit board 173a, is integrally embedded inside (covered with) the male body 110a. The control unit 160 is not shown in FIG. 1A.

The cable includes communication lines and power lines. From one lengthwise end portion of the cable protrude the communication lines and power lines. The protruded communication lines are connected to the third male circuit board 173a and thereby connected to the control unit 160a. The protruded power lines are connected to the third male circuit board 173a and thereby connected to the respective power-reception circuits 150a. The one end portion of the cable (including the protruded communication lines and power lines) is integrally embedded inside the male body 110a. In other words, the portion other than the one end portion of the cable is led out of the male body 110a in the Y' direction.

The male connector 100a as described above may be manufactured in the steps as detailed below. First, prepared are the first male circuit board 171a, the pair of second male circuit boards 172a, and the third male circuit board 173a. On the first male circuit board 171a, the male communication antennas 121a and 122a are formed and the communication circuits 131a and 132a are mounted. The communication circuit 131a is thus connected to the male communication antenna 121a, while the communication circuit 132a is connected to the male communication antenna 122a. The male power-reception antennas 140a are formed on the respective second male circuit boards 172a. The power-reception circuits 150a and the control unit 160a are mounted on the third male circuit board 173a. The control unit 160a is thus connected to the power-reception circuits 150a.

The first and second connection means are also prepared. The first connection means is used to connect the third male circuit board 173a to the first male circuit board 171a. The control unit 160a on the third male circuit board 173a is thus connected to the communication circuits 131a and 132a on the first male circuit board 171a. The second connection means is used to connect the third male circuit board 173a to the pair of second male circuit boards 172a. The pair of power-reception circuits 150a on the third male circuit board 173a is connected to the respective male power-reception antennas 140a on the second male circuit boards 172a. A cable is also prepared. The communication lines and the power lines of the cable are connected to the third male circuit board 173a.

Then, the first male circuit board 171a, the pair of second male circuit boards 172a, the third male circuit board 173a, the first and second connection means, and the one end portion of the cable are placed in a cavity of a die (not shown) in the following arrangement. The first male circuit board 171a is fixed such that the first male circuit board 171a is substantially parallel to the front wall of the cavity of the die and the male communication antennas 121a and 122a are located near this wall; the third male circuit board 173a is fixed so as to be located behind the first male circuit board 171a; one of the second male circuit board 172a is fixed such that one of the male power-reception antenna 140a is located near the upper wall of the cavity of the die; and the other second male circuit board 172a is fixed such that the other male power-reception antenna 140a is located near the lower wall of the cavity of the die.

After that, insulating resin is injected and filled into the cavity of the die. The insulating resin then hardens to mold as the male body 110a with the inserted components integrally embedded therein by insert-molding in the following arrangement. The first male circuit board 171a, the male communication antennas 121a and 122a, and the communication circuits 131a and 132a are embedded such that the first male circuit board 171a is substantially parallel to the front surface 111a of the male body 110a, and that the male communication antennas 121a and 122a are disposed near the front surface 111a of the male body 110a; the third male circuit board 173a, the power-reception circuits 150a, and the control unit 160a are embedded such that the third male circuit board 173a is disposed behind the first male circuit board 171a; one of the second male circuit board 172a and one of the male power-reception antenna 140a are embedded such that one of the male power-reception antennas 140a is disposed near the upper surface 111a of the male body 110a; and the other second male circuit board 172a and the other male power-reception antenna 140a are embedded such that the other male power-reception antenna 140a is disposed near the lower surface 111a of the male body 110a. This is how the male connector 100a is manufactured.

A female connector 100b according to Embodiment 1 of the invention will be described below with reference to FIG. 3A to FIG. 4C. The female connector 100b is connectable to the male connector 100a. The female connector 100b includes a female body 110b, a female communication antenna 121b, a female communication antenna 122b, a communication circuit 131b, another communication circuit 132b, two female power-transmission antennas 140b, two power-transmission circuits 150b, a control unit 160b, a first female circuit board 171b, two second female circuit boards 172b, a third female circuit board 173b, a plurality of first external connection means (not shown), and a plurality of second external connection means (not shown). These components of the female connector 100b will be described below in detail. The Y-Y' direction shown in FIG. 3A and FIG. 3B corresponds to the lengthwise direction of the female connector 100b and also the direction in which the male connector 100a is inserted into and removed from the female connector 100b. The Z-Z' direction shown in FIG. 3A and FIG. 3B corresponds to the height direction of the female connector 100b. The X-X' direction shown in FIG. 3A corresponds to the widthwise direction of the female connector 100b.

Figure 3A:
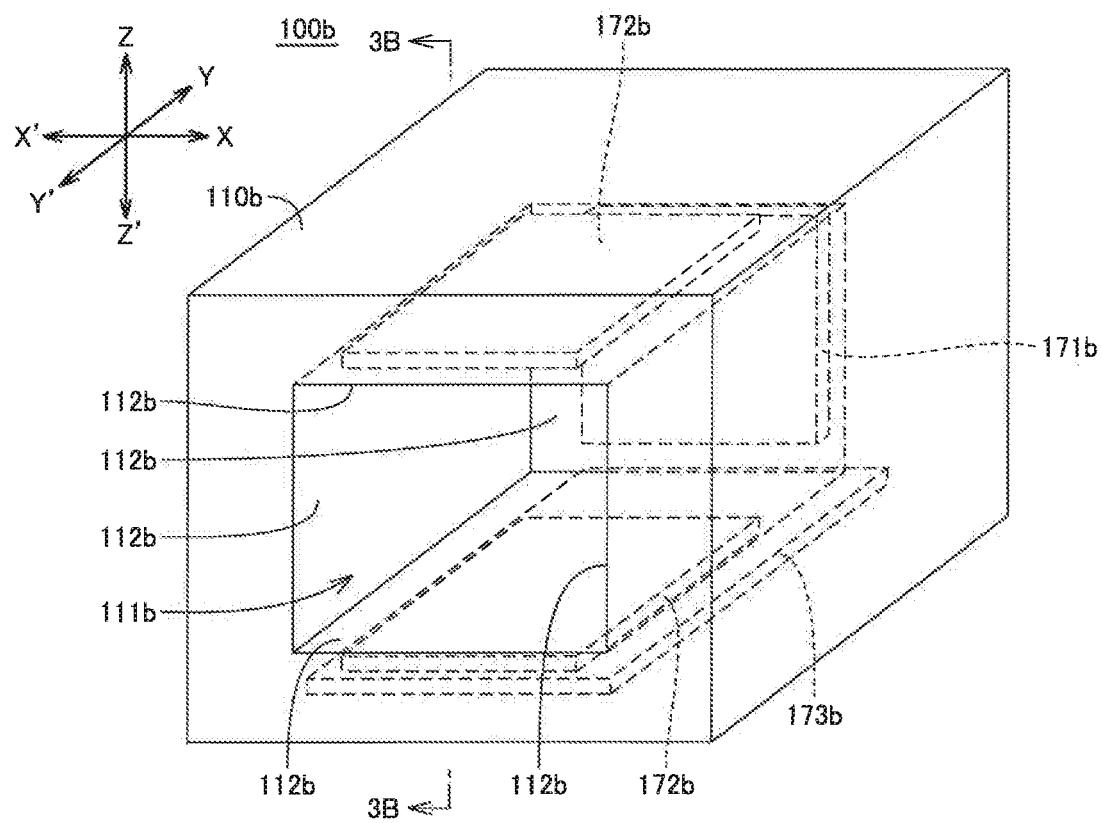
Figure 3B:
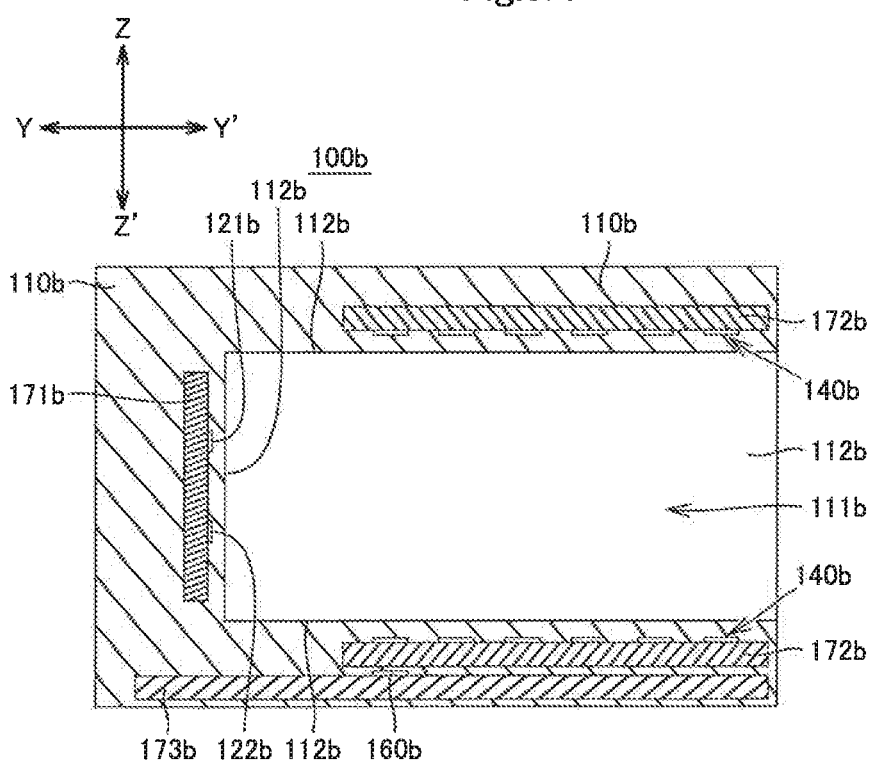
FIG. 3B is a sectional view of the female connector taken along 2B-2B in FIG. 2A.

The female body 110b as shown in FIG. 3A and FIG. 3B is made of an insulating resin. The female body 110b is non-translucent (opaque). The female body 110b has a connection hole 111b, which is a bottomed hole of polyhedron shape (hexahedron (rectangular parallelepiped)-shaped in the case of Embodiment 1). The connection hole 111b conforms to the outer shape of the male connector 100a and is open in the direction. The connection hole 111b is adapted to removably receive the male connector 100a in the Y-Y' direction. The male connector 100a can fit into the connection hole 111b so as to be and fixedly position inside in the connection hole 111b. The female body 110b includes a plurality of walls 112b of the connection hole 111b, namely a back (Y direction-side) wall 112b, an upper (Z direction-side) wall 112b, a lower (Z' direction-side) wall 112b, an X direction-side wall 112b, and an X' direction-side wall 112b. The walls 112b corresponds to non-overlapping wall regions of the connection hole of the female body as defined in the claims.

In the state where male connector 100a fixedly fits in position in the connection hole 111b of the female connector 100b (this state will be hereinafter referred to as a connected state), the back wall 112b may be opposed substantially in parallel to the front surface 111a of the male connector 100a, the upper wall 112b may be opposed substantially in parallel to the upper surface 111a of the male connector 100a, the lower wall 112b may be opposed substantially in parallel to the lower surface 111a of the male connector 100a, the X direction-side wall 112b may be opposed substantially in parallel to the X direction-side surface 111a of the male connector 100a, and the X' direction-side wall 112b may be opposed substantially in parallel to the X' direction-side surface 111a of the male connector 100a.

The first female circuit board 171b as shown in FIG. 3A to FIG. 4A is a rigid printed circuit board, a flexible printed circuit board, or a PET circuit board. On the first female circuit board 171b mounted are the female communication antennas 121b and 122b and the communication circuits 131b and 132b. The first female circuit board 171b is integrally embedded inside the female body 110b such that the female communication antennas 121b and 122b are located near (e.g. at a distance in the range of a few millimeters to several tens of millimeters from) the back wall 112b of the connection hole 111b in the female body 110b. In other words, the first female circuit board 171b is integrally embedded inside (covered with) the female body 110b at a point farther from the back wall 112b than the female communication antennas 121b and 122b are, and conversely the female communication antennas 121b and 122b are integrally embedded inside (covered with) the female body 110b at points closer to the back wall 112b than the first female circuit board 171b is. The first female circuit board 171b is oriented substantially in parallel to the back wall 112b.

The female communication antenna 121b is a reception antenna for wireless signal communication. The female communication antenna 122b is a transmission antenna for wireless signal communication. The female communication antennas 121b and 122b may be communication antennas conforming to a communication mode such as UWB, a WLAN, or Bluetooth (registered trademark). As shown in FIG. 3B to FIG. 4A, the female communication antennas 121b and 122b are conductors formed on and electrically connected to the first female circuit board 171b. The female communication antennas 121b and 122b, together with the first female circuit board 171b, are integrally embedded inside (covered with) the female body 110b. In the connected state, these antennas are disposed such that the female communication antenna 121b can wirelessly communicate with the male communication antenna 121a of the male connector 100a, and that the female communication antenna 122b can wirelessly communicate with the male communication antenna 122a of the male connector 100a. For convenience of explanation, FIG. 3B illustrates the female communication antennas 121b and 122b with exaggerated thicknesses. The female communication antennas 121b and 122b are not shown in FIG. 3A.

As shown in FIG. 3B to FIG. 4A, the communication circuit 131b is an IC for directing the female communication antenna 121b connected thereto to receive signals. The communication circuit 132b is a communication IC for directing the female communication antenna 122b connected thereto to transmit signals. The communication circuits 131b and 132b, together with the first female circuit board 171b, are integrally embedded inside (covered with) the female body 110b. When the female communication antenna 121b receives radio signals conforming to the predetermined communication mode, the communication circuit 131b demodulates the received radio signals to reproduce the data and transmits the data to the control unit 160b. The communication circuit 132b generates transmission signals on the basis of the data received from the control unit 160b and wirelessly transmits the transmission signals, as radio signals conforming to the predetermined communication mode to the female communication antenna 122b. Such radio signals conform to a predetermined communication mode, such as UWB, WLAN, and Bluetooth (registered trademark). The communication circuits 131b and 132b are not shown in FIG. 3A.

Figure 4A:
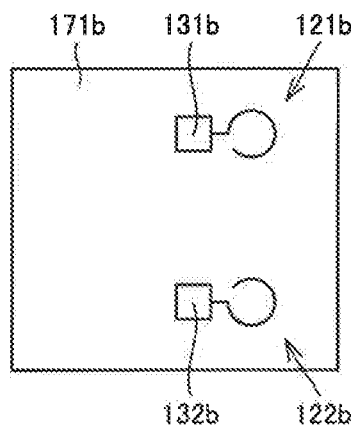
FIG. 4A is a view for the purpose of describing a first female circuit board and female communication antennas of the female connector.
Figure 4B:
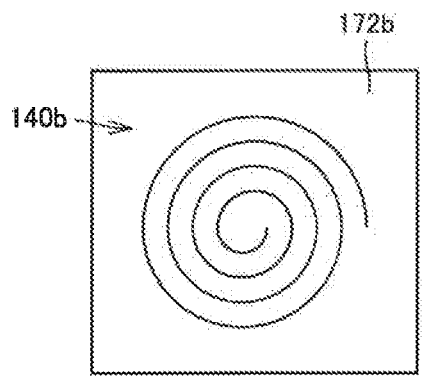
FIG. 4B is a view for the purpose of describing a second female circuit board and a female power-transmission antenna of the female connector.

The second female circuit boards 172b as shown in FIG. 3A to FIG. 3B and FIG. 4B are rigid printed circuit boards, flexible printed circuit boards, or PET circuit boards. One and the other female power-transmission antennas 140b are provided on one and the other, respectively, of the second female circuit boards 172b. The one of the second female circuit boards 172b is integrally embedded inside the female body 110b such that the one of the female power-transmission antennas 140b is located near the upper wall 112b of the female body 110b. In other words, the one of the second female circuit boards 172b is integrally embedded inside (covered with) the female body 110b at a point farther from the upper wall 112b than the one of the female power-transmission antennas 140b is, and conversely the one of the female power-transmission antennas 140b is integrally embedded inside (covered with) the female body 110b at a point closer to the upper wall 112b than the one of the second female circuit boards 172b is. The one of the second female circuit boards 172b may be substantially parallel, inclined, or orthogonal relative to the upper wall 112b. The other second female circuit board 172b is integrally embedded inside the female body 110b such that the other female power-transmission antenna 140b is located near the lower wall 112b of the female body 110b. In other words, the other second female circuit board 172b is integrally embedded inside (covered with) the female body 110b at a point farther from the lower wall 112b than the other female power-transmission antenna 140b is, and conversely the other female power-transmission antenna 140b is integrally embedded inside the female body 110b at a point closer to the lower wall 112b than the other second female circuit board 172b is. The other second female circuit board 172b may be substantially parallel, inclined, or orthogonal relative to the lower wall 112b.

The female power-transmission antennas 140b are primary antennas for wirelessly transmitting electric power via electromagnetic induction, electromagnetic resonance, electric field coupling, or electric wave form. As shown in FIG. 3A to FIG. 3B and FIG. 4B, the female power-transmission antennas 140b are conductors respectively formed on and electrically connected to the second male circuit boards 172a (i.e. conductive lines on the second male circuit boards 172a). In the connected state, these antennas are disposed such that one of the female power-transmission antennas 140b can wirelessly transmit power to one of the male power-reception antennas 140a of the male connector 100a, and that the other female power-transmission antenna 140b can wirelessly transmit power to the other male power-reception antenna 140a of the male connector 100a. For convenience of explanation, FIG. 3B illustrates the female power-transmission antennas 140b with exaggerated thicknesses. The female power-transmission antennas 140b are not shown in FIG. 3A.

Figure 4C:
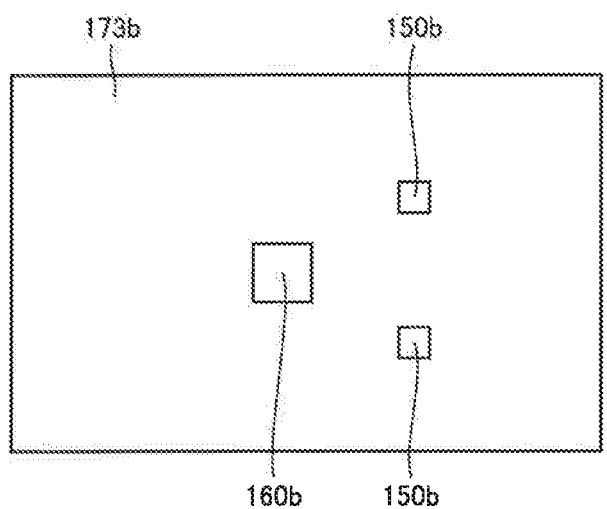
FIG. 4C is a view for the purpose of describing a third female circuit board of the female connector.

As shown in FIG. 3A to FIG. 3B and FIG. 4C, the third female circuit board 173b is a rigid printed circuit board, a flexible printed circuit board, or a PET circuit board. The third female circuit board 173b is integrally embedded inside (covered with) the female body 110b below (on the Z' direction-side of) the other second female circuit board 172b. The third female circuit board 173b is connected to the first female circuit board 171b via first connection means (not shown), such as pins, lead wires, or an FPC. The third female circuit board 173b is connected to the pair of second female circuit boards 172b via second connection means (not shown) such as pins, lead wires, or FPCs.

The power-transmission circuits 150b are power-transmission ICs for converting electric power, which is supplied from an external power source via the second external connection means, into electric power (e.g. high-frequency power) that is suitable for transmission via electromagnetic induction, electromagnetic resonance, electric field coupling, or electric wave form. The power-transmission circuits 150b feed the converted power into the female power-transmission antennas 140b. The power-transmission circuits 150b are mounted on the third female circuit board 173b and, together with the third female circuit board 173b, integrally embedded inside (covered with) the female body 110b. One of the power-transmission circuits 150b is connected to one of the female power-transmission antennas 140b on one of the second female circuit board 172b via the second connection means, and the other power-transmission circuit 150b on the third female circuit board 173b is connected to the other female power-transmission antenna 140b on the other second female circuit board 172b via the second connection means. The power-transmission circuits 150b are not shown in FIG. 3A.

The control unit 160b is a microcomputer for controlling the communication circuits 131b and 132b and the power-transmission circuits 150b. As shown in FIG. 4C, the control unit 160b is mounted on the third female circuit board 173b. The control unit 160b is connected to the power-transmission circuits 150b. The control unit 160b is also connected to the communication circuits 131b and 132b via the first connection means. The control unit 160, together with the third female circuit board 173b, is integrally embedded inside (covered with) the female body 110b. The control unit 160 is not shown in FIG. 3A.

The plurality of first external connection means are used for signal communication and may be terminals, pins, or conductive lines of a flexible circuit board. Each first external connection means includes a front portion and a rear portion. The first external connection means excluding their rear portions (and including connection portions) are integrally embedded inside the female body 110b. In other words, the rear portions of the first external connection means protrude from the female body 110b. The front portions of the first external connection means are thus connected to the third female circuit board 173b. The first external connection means are thus connected to the control unit 160a via the third female circuit board 173b. The rear portions of the first external connection means are used for external connection.

The plurality of second external connection means are used for power transfer and may be terminals, pins, or conductive lines of a flexible circuit boards. Each second external connection means includes a front portion and a rear portion. The second external connection means excluding their rear portions (and including connection portions) are integrally embedded inside the female body 110b. In other words, the rear portions of the second external connection means protrude from the female body 110b. The front portions of the second external connection means are connected to the third female circuit board 173b. The second external connection means are thus connected to the respective power-transmission circuits 150b via the third female circuit board 173b. The rear portions of the second external connection means are used for external connection.

The female connector 100b as described above may be manufactured in the steps as detailed below. First, prepared are the first female circuit board 171b, the pair of second female circuit boards 172b, and the third female circuit board 173b. On the first female circuit board 171b, the female communication antennas 121b and 122b are formed and the communication circuits 131b and 132b are mounted. The communication circuit 131b is thus connected to the female communication antenna 121b, while the communication circuit 132b is connected to the female communication antenna 122b. On the respective second female circuit boards 172b, the female power-transmission antennas 140b are formed. On the third female circuit board 173b, the power-transmission circuits 150b and the control unit 160b are mounted. The control unit 160b is thus connected to the power-transmission circuits 150b.

The first and second connection means are also prepared. The first connection means is used to connect the third male circuit board 173b to the first female circuit board 171b. The control unit 160b on the third female circuit board 173b is thus connected to the communication circuits 131b and 132b on the first female circuit board 171b. The second connection means is used to connect the third female circuit board 173b to the pair of second female circuit boards 172b. The pair of power-transmission circuits 150b on the third female circuit board 173b is thus connected to the respective female power-transmission antennas 140b on the second female circuit boards 172b. The first and second external connection means are also prepared. The front portions of the first and second external connection means are connected to the third female circuit board 173b.

Then, the first female circuit board 171b, the second female circuit boards 172b, the third female circuit board 173b, the first and second connection means, and the first and second external connection means other than their rear portions are placed in a cavity of a die (not shown) in the following arrangement. The first female circuit board 171b is fixed such that the first female circuit board 171b is substantially parallel to the front face of a generally rectangular parallelepiped projection in the cavity of the die, and that the female communication antennas 121b and 122b are disposed near this front face; one of the second female circuit boards 172b is fixed such that one of the female power-transmission antennas 140b is located near the upper face of the projection in the die; the other second female circuit board 172b is fixed such that the other female power-transmission antenna 140b is located near the lower face of the projection of the die; and the third female circuit board 173b is fixed so as to be located below the other second female circuit board 172b.

Then, insulating resin is injected and filled into the cavity of the die. The insulating resin then hardens to mold as the female body 110b. The projection of the die serves to form the connection hole 111b of the female body 110b. The inserted components are embedded by insert-molding in the female body 110b in the following arrangement. The first female circuit board 171b, the female communication antennas 121b and 122b, and the communication circuits 131b and 132b are embedded such that the first female circuit board 171b is substantially parallel to the back wall 112b of the connection hole 111b of the female body 110b, and that the female communication antennas 121b and 122b are disposed near the back wall 112b of the female body 110b; one of the second female circuit boards 172b and one of the female power-transmission antennas 140b are embedded such that the one of the female power-transmission antennas 140b is disposed near the upper wall 112b of the connection hole 111b of the female body 110b; the other second female circuit board 172b and the other female power-transmission antenna 140b are embedded such that the other female power-transmission antenna 140b is disposed near the lower wall 112b of the connection hole 111b of the female body 110b; the third female circuit board 173b, the power-transmission circuits 150b, and the control unit 160b are embedded such that the third female circuit board 173b is disposed below the other second female circuit board 172b. This is how the female connector 100b is manufactured.

Figure 5:
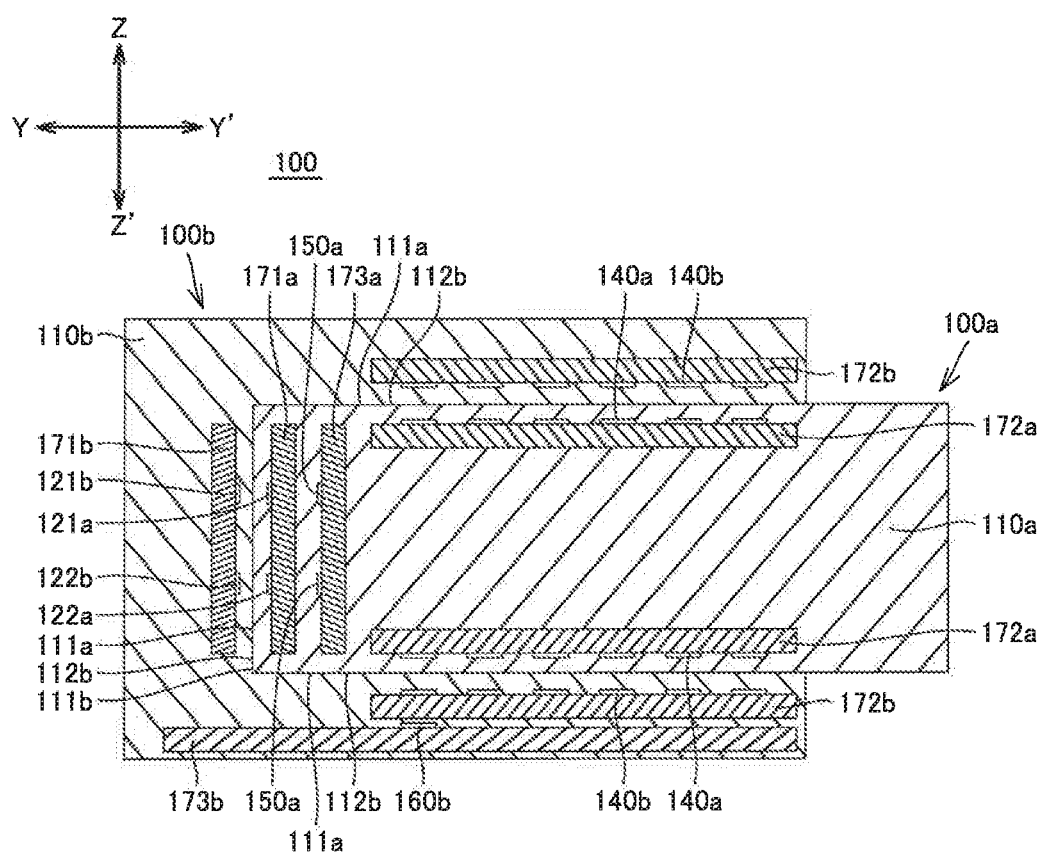
FIG. 5 is a sectional view of a connection structure of the male connector and the female connector according to Embodiment 1 of the invention.

A connection structure 100 according to Embodiment 1 of the invention includes the male connector 100a and the female connector 100b as described above. As shown in FIG. 5, when the male connector 100a is connected to the female connector 100b, the male connector 100a fits into the connection hole 111b of the female connector 100b so as to be fixed in position in the connection hole 111b of the female connector 100b. In this state, as described above, the outer surfaces 111a of the male connector 100a are opposed to the respective walls 112b of the connection hole 111b of the female connector 100b. Also, the male communication antenna 121a located near the front surface 111a and the female communication antenna 121b located near the back wall 112b are disposed such that these antennas can wirelessly communicate with each other. The male communication antenna 122a located near the front surface 111a and the female communication antenna 122b located near the back wall 112b are disposed such that these antennas can wirelessly communicate with each other. One of the male power-reception antennas 140a located near the upper surface 111a and one of the female power-transmission antennas 140b located near the upper wall 112b are disposed such that these antennas can wirelessly transfer power therebetween. The other male power-reception antenna 140a located near the lower surface 111a and the other female power-transmission antenna 140b located near the lower wall 112b are disposed such that these antennas can wirelessly transfer power therebetween. This is the connected state of the connection structure 100 in which the male connector 100a is connected to the female connector 100b.

The connection structure 100 described has at least the following technical features. First, the male connector 100a and the female connector 100b are suitable for long-term use for the following reasons. As to the male connector 100a, the male communication antennas 121a and 122a, the communication circuits 131a and 132a, the male power-reception antennas 140a, the power-reception circuits 150a, the control unit 160a, the first male circuit board 171a, the second male circuit boards 172a, and the third male circuit board 173a are embedded inside the male body 110a by insert-molding. As to the female connector 100b, the female communication antennas 121b and 122b, the communication circuits 131b and 132b, the female power-transmission antennas 140b, the power-transmission circuits 150b, the control unit 160b, the first female circuit board 171b, the second female circuit boards 172b, and the third female circuit board 173b are embedded inside the female body 110b by insert-molding.

Second, the male connector 100a and the female connector 100b can properly operate even when subjected to water (including moisture), dust, dirt, contaminants and/or corrosive substances. More particularly, communication characteristics of the male communication antennas 121a and 122a and the female communication antennas 121b and 122b are unlikely to deteriorate, and power transmission characteristics of the male power-reception antennas 140a and the female power-transmission antennas 140b are unlikely to deteriorate. This is because the male communication antennas 121a and 122a and the male power-reception antennas 140a are embedded inside the male body 110a by insert-molding and thus unexposed to the outside of the male body 110a, and also because the female communication antennas 121b and 122b and the female power-transmission antennas 140b are embedded inside the female body 110b by insert-molding and thus unexposed to the outside of the female body 110b. For this reason, the male communication antennas 121a and 122a, the male power-reception antennas 140a, the female communication antennas 121b and 122b, and the female power-transmission antennas 140b will not deteriorate or corrode.

Third, the connection structure 100 provides improved communication characteristics and power transmission characteristics. More particularly, improvements are made in communication characteristics between the male communication antennas 121a and 122a of the male connector 100a and the female communication antennas 121b and 122b of the female connector 100b, in power transmission characteristics between one of the male power-reception antennas 140a of the male connector 100a and one of the female power-transmission antennas 140b of the female connector 100b, and in power transmission characteristics between the other male power-reception antenna 140a of the male connector 100a and the other female power-transmission antenna 140b of the female connector 100b. The reasons are as follows. The male communication antennas 121a and 122a, one of the male power-reception antennas 140a, and the other male power-reception antenna 140a are integrally embedded inside the male body 110a so as to be located near different outer surfaces 111a of the male body 110a. The female communication antennas 121b and 122b, one of the female power-transmission antennas 140b, and the other female power-transmission antenna 140b are integrally embedded inside the female body 110b so as to be located near different walls 112b of the connection hole 111b of the female body 110b. These arrangements can reduce the possibility of: 1) noise from the male communication antenna 121a and/or the male communication antenna 122a interfering with the female communication antenna 121b, the female communication antenna 122b, the male power-reception antennas 140a, and/or the female power-transmission antennas 140b; 2) noise from the female communication antenna 121b and/or the female communication antenna 122b interfering with the male communication antenna 121a, the male communication antenna 122a, the male power-reception antennas 140a, and/or the female power-transmission antennas 140b; 3) noise from the male power-reception antennas 140a interfering with the male communication antenna 121a, the male communication antenna 122a, the female communication antenna 121b, the female communication antenna 122b, and/or the female power-transmission antennas 140b; and 4) noise from the female power-transmission antennas 140b interfering with the male communication antenna 121a, the male communication antenna 122a, the female communication antenna 121b, the female communication antenna 122b, and/or the male power-reception antennas 140a. Generally speaking, in the case the antennas are disposed in a housing space of a body, the body needs to be formed with larger thicknesses (larger distance between the inner walls of the housing space and the outer surfaces of the body). On the other hand, the connection structure 100 can reduce the distance between each antenna and the nearest one of the outer surfaces 111a in the male connector 100a. This is because the male communication antennas 121a and 122a, one of the male power-reception antennas 140a, and the other male power-reception antenna 140a are integrally embedded inside the male body 110a so as to be located near different outer surfaces 111a of the male body 110a. The connection structure 100 can also reduce the distance between each antenna and the nearest one of the walls 112b in the female connector 100b. This is because the female communication antennas 121b and 122b, one of the female power-transmission antenna 140b, and the other female power-transmission antenna 140b are integrally embedded inside the female body 110b so as to be located near different walls 112b of the connection hole 111b of the female body 110b. Therefore, in the connected state, each antenna of the male connector 100a is located at a smaller distance (e.g. about 4 mm) from the associated antenna of the female connector 100b. This arrangement can improve the signal integrity between the male communication antennas 121a and 122a and the female communication antennas 121b and 122b and also improve the power feeding efficiency between the male power-reception antennas 140a and the female power-transmission antennas 140b. The improvement in power feeding efficiency also contributes to reduction of heat generated in the male power-reception antennas 140a, the power-reception circuits 150a, the female power-transmission antennas 140b, and the power-transmission circuits 150b.

Fourth, it is possible to reduce the risk of breakdown of wireless communication between the male communication antennas 121a and 122a and the female communication antennas 121b and 122b. This is because, in the connected state, these antennas are arranged within a range that allows wireless communication between the female communication antenna 121b and the male communication antenna 121a, and between the female communication antenna 122b and the male communication antenna 122a. Especially in the case where the communicable distance between the male communication antenna 121a and the female communication antenna 121b and the distance between the male communication antenna 122a and the female communication antenna 122b are each a small value, such as several centimeters, displacement of the male communication antennas 121a and 122a relative to the female communication antennas 121b and 122b, respectively, can cause breakdown of wireless communication therebetween. However, the connection structure 100 is configured such the male communication antennas 121a and 122a and the female communication antennas 121b and 122b can be disposed within a range allowing wireless communication therebetween merely by inserting and fixedly positioning the male connector 100a into the connection hole 111b of the female connector 100b. This configuration can thus avoid the above risk of communication breakdown.

Fifth, it is possible to reduce the risk of breakdown of wireless power transmission between the male power-reception antennas 140a and the female power-transmission antennas 140b. This is because, in the connected state, the male power-reception antennas 140a and the female power-transmission antennas 140b are arranged such that the female power-transmission antennas 140b can wirelessly transmit power to the respective male power-reception antennas 140a. Especially in the case where, as in the case of power transmission by electromagnetic induction, the female power-transmission antennas 140b can wirelessly transmit power over only a small distance to the respective male power-reception antennas 140a, displacement of the male power-reception antennas 140a relative to the female power-transmission antennas 140b can cause breakdown of wireless power transmission. However, the connection structure 100 is configured such that the male power-reception antennas 140a and the female power-transmission antennas 140b can be disposed within a range allowing wireless power transmission therebetween merely by inserting and fixedly positioning the male connector 100a into the connection hole 111b of the female connector 100b. This configuration can thus avoid the above risk of breakdown of wireless power transmission.

Embodiment 2

A male connector 100a' according to Embodiment 2 of the invention be described below with reference to FIG. 6A. The male connector 100a' has the same configuration as the male connector 100a of Embodiment 1 except for the following differences. The first difference is that the male body 110a' has a different shape from that of the male body 110a of Embodiment 1. The second difference is that the first mate circuit board 171a, the pair of second male circuit boards 172a, and the third male circuit board 173a of this embodiment integrally embedded inside a male body 110a' are located at different positions from the positions in which the first male circuit board 171a, the second male circuit boards 172a, and the third male circuit board 173a of Embodiment 1 embedded inside the male body 110a. These differences will be described below in detail, but overlapping descriptions will be omitted. The Y-Y' direction shown in FIG. 6A corresponding to the lengthwise direction of the male connector 100a' and the insertion/extraction direction of the male connector 100a' as described below. The Z-Z' direction shown in FIG. 6A corresponds to the height direction of the male connector 100a'.

Figure 6A:
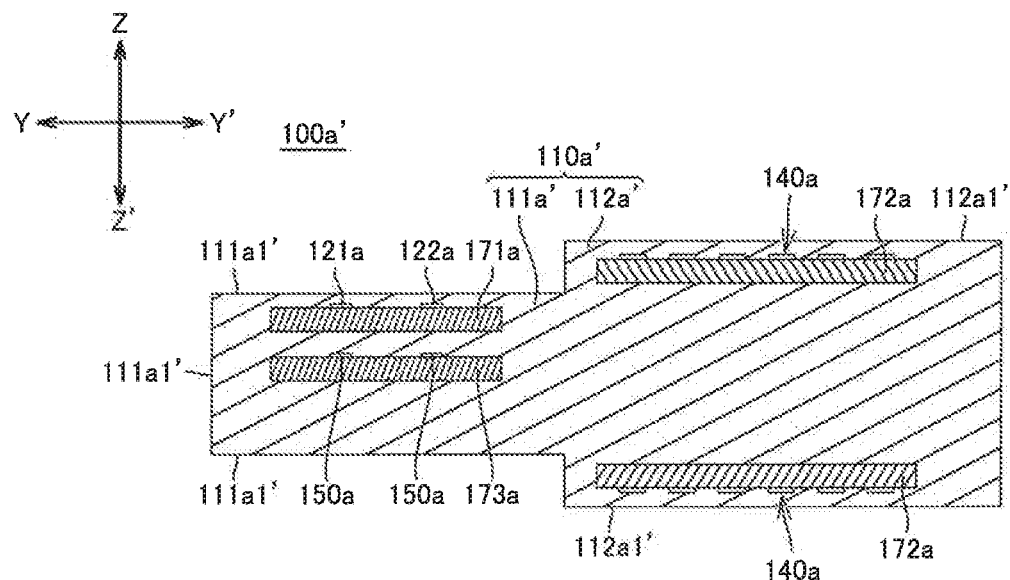
FIG. 6A is a schematic sectional view of a male connector according to Embodiment 2 of the invention.

As shown in FIG. 6A, the male body 110a' includes a first body 111a' and a second body 112a'. The first body 111a' is insulating resin formed in the shape of polyhedron (hexahedron (rectangular parallelepiped) in the case of Embodiment 2). The second body 112a' is also insulating resin formed in the shape of polyhedron (hexahedron (rectangular parallelepiped) in the case of Embodiment 2). The second body 112a' is connected to the first body 111a' and has a larger outer shape than the first body 111a'. The first and second bodies 111a' and 112a' are non-translucent (opaque). The first body 111a' has a plurality of outer surfaces 111a1', namely a front (Y direction-side) surface 111a1', an upper (Z direction-side) surface 111a1', a lower (Z' direction-side) surface 111a1', and a pair of lateral surfaces (i.e. surfaces in the short direction, not shown). The second body 112a' has a plurality of outer surfaces 112a1', namely an upper (Z direction-side) surface 112a1', a lower (Z' direction-side) surface 112a1', a pair of lateral surfaces (i.e. surfaces in the short direction, not shown). The outer surfaces 111a1' and 112a1' corresponds to non-overlapping outer surface regions of the male body as defined in the claims.

The first male circuit board 171a is integrally embedded inside the first body 111a' such that the male communication antennas 121a and 122a are located near (e.g. at a distance in the range of a few millimeters to several tens of millimeters from) the upper surface 111a1' of the first body 111a' of the male body 110a'. In other words, the first male circuit board 171a is integrally embedded inside (covered with) the first body 111a' at a point farther from the upper surface 111a1' than the male communication antennas 121a and 122a are, and conversely the male communication antennas 121a and 122a are integrally embedded inside (covered with) the first body 111a' at points closer to the upper surface 111a1' than the first male circuit board 171a is. The first male circuit board 171a is oriented substantially in parallel to the upper surface 111a1'. The third male circuit board 173a is integrally embedded inside (covered with) the first body 111a' of the male body 110a' so as to be located below (on Z' direction-side of) the first male circuit board 171a in the first body 111a'.

One of the second male circuit boards 172a is integrally embedded inside the second body 112a' such that one of the male power-reception antennas 140a is located near the upper surface 112a1' of the second body 112a' of the male body 110a'. In other words, the one of the second male circuit boards 172a is integrally embedded inside (covered with) in the second body 112a' at a point farther from the upper surface 112a1' than the one of the male power-reception antennas 140a is, and conversely the one of the male power-reception antennas 140a is integrally embedded inside (covered with) in the second body 112a' at a point closer to the upper surface 112a1' than the one of the second male circuit boards 172a is. The one of the second male circuit boards 172a may be substantially parallel, inclined, or orthogonal relative to the upper surfaces 111a. The other second male circuit board 172a is integrally embedded inside the second body 112a' such that the other male power-reception antenna 140a is located near the lower surface 112a1' of the second body 112a'. In other words, the other second male circuit board 172a is integrally embedded inside (covered with) the second body 112a' at a point farther from the lower surface 112a1' than the other male power-reception antenna 140a is, and conversely the other male power-reception antenna 140a is integrally embedded inside (covered with) the second body 112a' at a point closer to the lower surface 112a1' than the other second male circuit board 172a is. The other second male circuit board 172a may be substantially parallel, inclined, or orthogonal relative to the lower surface 112a1'.

The male connector 100a' as described above may be manufactured in the steps as detailed below. The manufacturing method may be the same as that for the male connector 100a of Embodiment 1, from the step of preparing the first male circuit board 171a, the pair of second male circuit boards 172a, and the third male circuit board 173a until just before the step of placing the first male circuit board 171a, the pair of second male circuit boards 172a, the third male circuit board 173a, the first and second connection means, and one end portion of the cable into a cavity of a die. The cavity, not shown, of the die consists of a first cavity, adapted for forming the first body 111a', and a second cavity, adapted for forming the second body 112a'.

The first male circuit board 171a, the pair of second male circuit boards 172a, the third male circuit board 173a, the first and second connection means, and the end portion of the cable are placed in the cavity of the die in the following arrangement. The first male circuit board 171a is fixed in the first cavity of the die such that the first male circuit board 171a is substantially parallel to the upper wall of the first cavity and that the male communication antennas 121a and 122a are disposed near the same wall. The third male circuit board 173a is fixed in the first cavity of the die so as to be located below the first male circuit board 171a. The one of the second male circuit boards 172a is fixed in the second cavity of the die such that the one of the male power-reception antennas 140a is located near the upper wall of the second cavity. The other second male circuit board 172a is fixed in the second cavity of the die such that other male power-reception antenna 140a is located near the lower wall of the second cavity.

After that, insulating resin is injected and filled into the cavity of the die. The insulating resin that has hardened in the first cavity molds as the male body 111a' of the male body 110a', while the insulating resin that has hardened in the second cavity molds as the second body 112a' of the male body 110a'. The inserted components are embedded by insert-molding in the male body 111a' in the following arrangement. The first male circuit board 171a, the male communication antennas 121a and 122a, and the communication circuits 131a and 132a are embedded inside the first body 111a' of the male body 110a' such that the first male circuit board 171a is substantially parallel to the upper surface 111a1' of the first body 111a', and that the male communication antennas 121a and 122a are disposed near the upper surface 111a' of the first body 111a' of the male body 110a'; the third male circuit board 173a, the power-reception circuits 150a, and the control unit 160a are embedded inside the first body 111a' such that the third male circuit board 173a is disposed below the first male circuit board 171a; one of the second male circuit boards 172a and one of the male power-reception antennas 140a are embedded inside the second body 112a' of the male body 110a' such that the one of the male power-reception antennas 140a is disposed near the upper surface 112a1' of the second body 112a'; the other second male circuit board 172a and the other male power-reception antenna 140a are embedded inside the second body 112a' such that the other male power-reception antenna 140a is disposed near the lower surface 112a1' of the second body 112a'. This is how the male connector 100a' is manufactured.

Figure 6B:
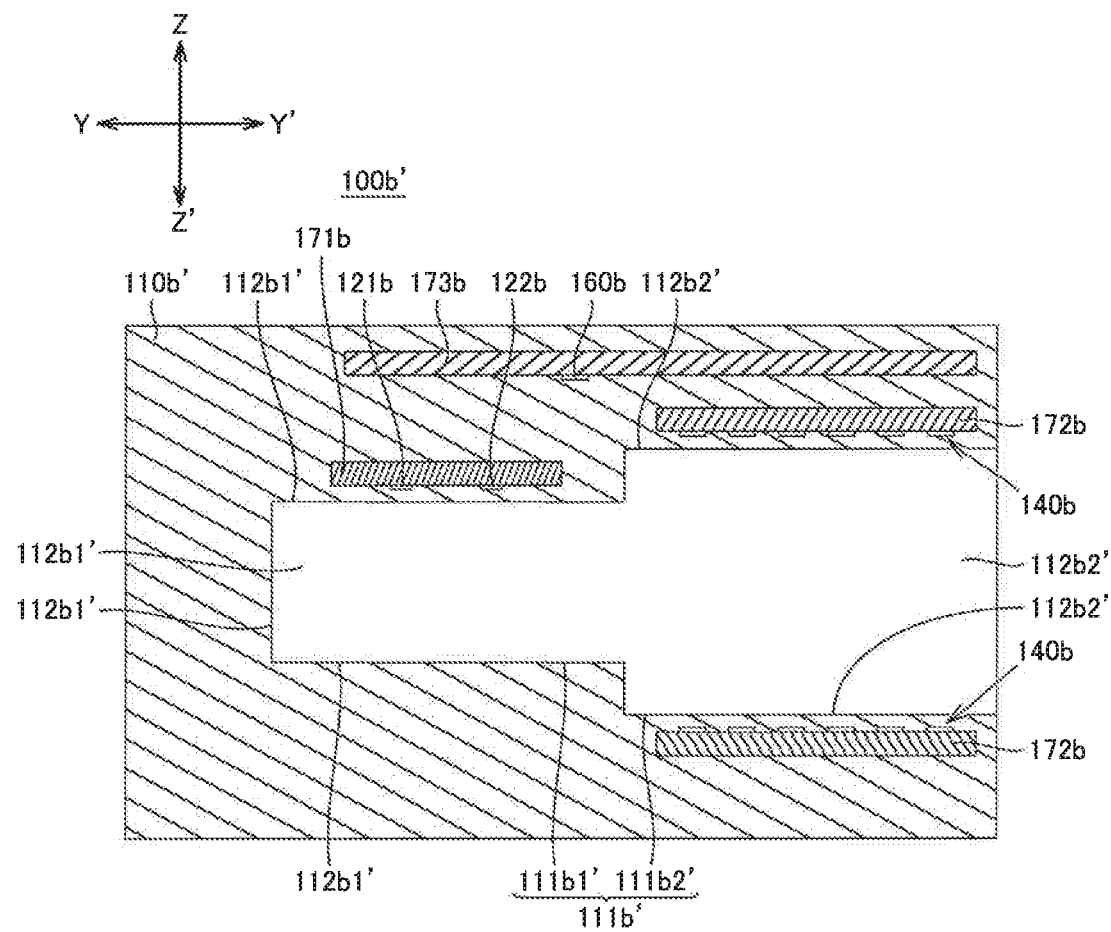
FIG. 6B is a schematic sectional view of a female connector according to Embodiment 2 of the invention.

A female connector 100b' according to Embodiment 2 of the invention will be described below with reference to FIG. 6B. The female connector 100b' is connectable to the male connector 100a'. The female connector 100b' has the same configuration as the female connector 100b of Embodiment 1 except for the following differences. The first difference is that the female body 110b' has a connection hole 111b' of a different shape from the connection hole 111b of the female body 110b of Embodiment 1. The second difference is that the first female circuit board 171b, the pair of second female circuit boards 172b, and the third female circuit board 173b embedded inside the female body 110b' are located at different positions from the positions in which the first female circuit board 171b, the pair of second female circuit boards 172b, and the third female circuit board 173b of Embodiment 1 embedded inside the female body 110b. These differences will be described below in detail, but overlapping descriptions will be omitted. The Y-Y' direction shown in FIG. 6B corresponds to the lengthwise direction of the female body 110b' and also the direction in which the male connector 100a is inserted into and removed from the female connector 100b'. The Z-Z' direction shown in FIG. 6B corresponds to the height direction of the female body 110b'.

The connection hole 111b' of the female body 110b' is a bottomed hole that conforms to the outer shape the male connector 100a and is open in the Y' direction. The connection hole 111b' is adapted to removably receive the male connector 100a' in the Y-Y' direction. The connection hole 111b' has a first connection hole 111b1' and a second connection hole 111b2' in communication with each other. The first connection hole 111b1' is a hole of hexahedron (rectangular parallelepiped) shape conforming the outer shape of the first body 111a of the male connector 100a'. The second connection hole 111b2' is a hole of hexahedron (rectangular parallelepiped) shape conforming the outer shape of the second body 112a' of the male connector 100a'. The second connection hole 111b2' is of larger size than the first connection hole 111b1'. The male connector 100a' is fixed in position in the connection hole 111b' by fitting the first body 111a' into the first connection hole 111b1' and the second body 112a' into the second connection hole 111b2'. The female body 110b' includes a plurality of walls 112b1' of the first connection hole 111b1', namely a back (Y direction-side) wall 112b1', an upper (Z direction-side) wall 112b1', a lower (Z' direction-side) wall 112b1', a pair of walls 112b1' in the short direction (one of them is shown and the other is not shown). The female body 110b' also includes a plurality of wall 112b2' of the second connection hole 111b2', namely a back (Y direction-side) wall 112b2', an upper (Z direction-side) wall 112b2', a lower (Z' direction-side) wall 112b2', a pair of walls 112b2' in the short direction (one of them is shown and the other is not shown). The walls 112b1' and 112b2' correspond to non-overlapping wall regions of the connection hole of the female body as defined in the claims.

In the state where the male connector 100a' fixedly fits in the first and second connection holes 111b1', 111b2' of the female connector 100b' (this state will be hereinafter referred to as the connected state), the walls 112b1' of the first connection hole 111b1' and walls 112b2' of second connection hole 111b2' may be located as follows. The back wall 112b1 may be opposed to the front surface 111a1' of the first body of the male connector 100a'; the upper wall 112b1' may be opposed to the upper surface 111a1' of the first body 111a'; the lower wall 112b1' of the first connection hole 111b1' may be opposed to the lower surface 111a1' of the first body 111a', the walls 112b1' in the short direction of the first connection hole 111b1' may be opposed to the respective surfaces 111a1' in the short direction of the first body 111a'. Also, the upper wall 112b2' of the second connection hole 111b2' may be opposed to the upper surface 112a1' of the second body 112a' of the male connector 100a', the lower wall 112b2' of the second connection hole 111b2' may be opposed to the lower surface 112a1' of the second body 112a', and the walls 112b2' in the short direction of the second connection hole 111b2' may be opposed to the respective surfaces 112a1' of the second body 112a'.

The first female circuit board 171b is integrally embedded inside the female body 110b' such that the female communication antennas 121b and 122b are located near (e.g. at a distance in the range of a few millimeters to several tens of millimeters from) the upper wall 112b1' of the first connection hole 111b1' of the female body 110b'. In other words, the first female circuit board 171b is integrally embedded inside (covered with) the female body 110b' at a point farther from the upper wall 112b1' than the female communication antennas 121b and 122b are, and conversely the female communication antennas 121b and 122b are integrally embedded inside (covered with) the female body 110b' at points closer to the upper wall 112b1' than the first female circuit board 171b is. The first female circuit board 171b is oriented substantially in parallel to the upper wall 112b1'.

One of the second female circuit boards 172b is integrally embedded inside the female body 110b' such that one of the female power-transmission antennas 140b is located near the upper wall 112b2' of the second connection hole 111b2' of the female body 110b'. In other words, the one of the second female circuit boards 172b is integrally embedded inside (covered with) the female body 110b' at a point farther from the upper wall 112b2' than the one of the female power-transmission antennas 140b is, and conversely the one of the female power-transmission antennas 140b is integrally embedded inside (covered with) the female body 110b' at a point closer to the upper wall 112b2' than the one of the second female circuit boards 172b is. The one of the second female circuit boards 172b may be substantially parallel, inclined, or orthogonal relative to the upper wall 112b2'. The other second female circuit board 172b is integrally embedded inside the female body 110b' such that the other female power-transmission antenna 140b is located near the lower wall 112b2' of the second connection hole 111b2' of the female body 110b'. In other words, the other second female circuit board 172b is integrally embedded inside (covered with) the female body 110b' at a point further from the lower wall 112b2' than the other female power-transmission antenna 140b is, and conversely the other female power-transmission antenna 140b is integrally embedded inside (covered with) the female body 110b' at a point closer to the lower wall 112b2' than the other second female circuit board 172b is. The other second female circuit board 172b may be substantially parallel, inclined, or orthogonal relative to the lower wall 112b2'.

The third female circuit board 173b is embedded inside (covered with) the female body 110b' so as to be located above (on the Z direction-side of) the one of the second female circuit boards 172b' of the female body 110b'.

The female connector 100b' as described above may be manufactured in the steps as detailed below. The manufacturing method may be the same as that for the female connector 100b of Embodiment 1, from the step of preparing the first female circuit board 171b, the pair of second female circuit boards 172b, and the third female circuit board 173b until just before the step of placing the first female circuit board 171b, the pair of second female circuit boards 172b, the third female circuit board 173b, the first and second connection means, and the first and second external connection means other than their rear portions in a cavity of a die not shown. The cavity of the die includes a first convex portion, shaped to form the first connection hole 111b1', and a second convex portion, shaped to form the second connection hole 111b2'.

The first female circuit board 171b, the pair of second female circuit boards 172b, the third female circuit board 173b, the first and second connection means, and the portion of the first and second external connection means other than their rear portions are placed in the cavity of the die in the following arrangement. The first female circuit board 171b is fixed such that the first female circuit board 171b is substantially parallel to the upper face of the first projection of the die, and that the female communication antennas 121b and 122b are disposed near the same upper face; one of the second female circuit boards 172b is fixed such that one of the female power-transmission antennas 140b is located near the upper face of the second projection of the die; the other second female circuit board 172b is fixed such that the other female power-transmission antenna 140b is located near the lower face of the second projection of the die; and the third female circuit board 173b is fixed so as to be located above the one of the second female circuit board 172b.

After that, insulating resin is injected and filled into the cavity of the die. The insulating resin then hardens to mold as the female body 110b'. The first projection of the die serves to form the first connection hole of the female body 110b', and the second projection of the die serves to form the second connection hole 111b2' of the female body 110b'. The inserted components are embedded in female body 110b' by insert-molding in the following arrangement. The first female circuit board 171b, the female communication antennas 121b and 122b, and the communication circuits 131b and 132b are embedded such that the first female circuit board 171b is substantially parallel to the upper wall 112b1' of the first connection hole 111b1' of the female body 110b' and that the female communication antennas 121b and 122b are disposed near the upper wall 112b1' of the female body 110b'; one of the second female circuit boards 172b and one of the female power-transmission antennas 140b are embedded such that the one of the female power-transmission antennas 140b is disposed near the upper wall 112b2' of the second connection hole 111b2' of the female body 110b'; the other second female circuit board 172b and the other female power-transmission antenna 140b are embedded such that the other female power-transmission antenna 140b is disposed near the lower wall 112b2' of the second connection hole 111b2' of the female body 110b'; the third female circuit board 173b, the power-transmission circuits 150b, and the control unit 160b are embedded inside the female body 110b' such that the third female circuit board 173b is disposed above the one of the second female circuit boards 172b. This is how the female connector 100b is manufactured.

Figure 7:
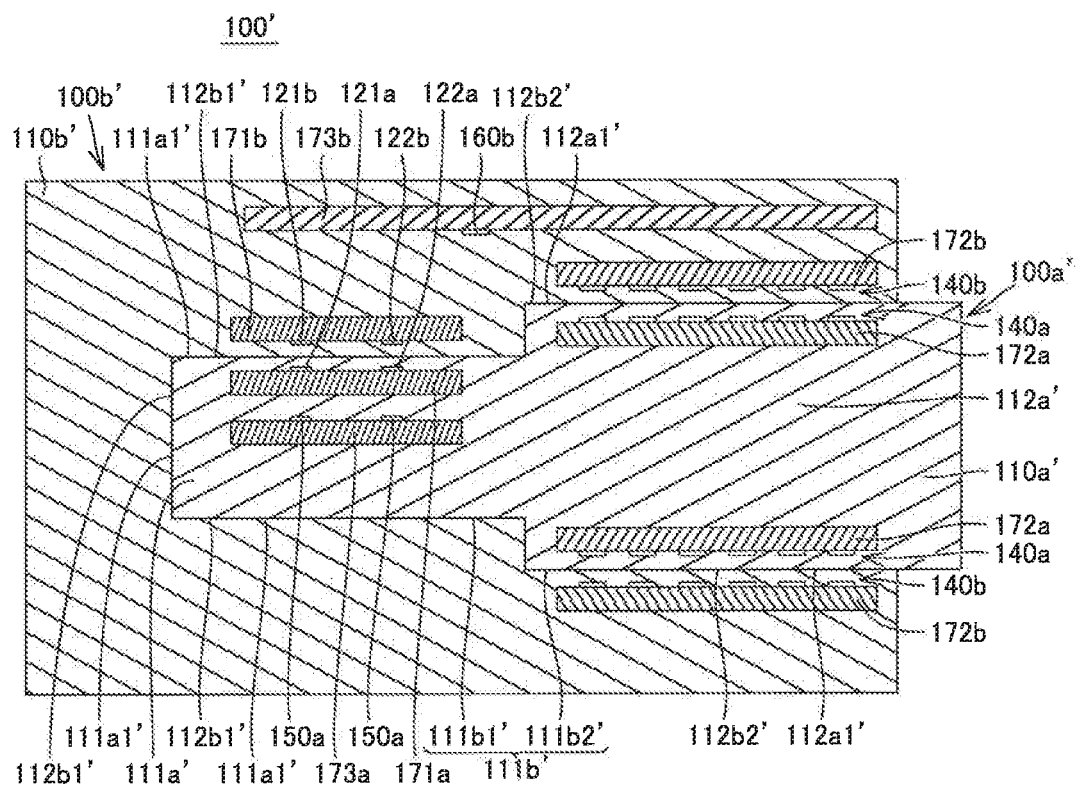
FIG. 7 is a sectional view of a connection structure of the male connector and the female connector according to Embodiment 2 of the invention.

A connection structure 100' according to Embodiment 2 of the invention includes the male connector 100a' and the female connector 100b'. As shown in FIG. 7, when the male connector 100a' is connected to the female connector 100b', the male connector 100a' fits in the connection hole 111b' of the female connector 100b' (the first and second bodies 111a', 112a' fit in the first and second connection holes 111b1' and 111b2', respectively), so that the male connector 100a' is fixed in position in the connection hole 111b' of the female connector 100b'. In this state, as described above, the outer surfaces 111a1' of the first body 111a' of the male connector 100a' are opposed to the respective walls 112b1' of the first connection hole 111b1' of the female connector 100b', and the outer surfaces 112a1' of the second body 112a' of the male connector 100a' are opposed to the respective walls 112b2' of the second connection hole 111b2' of the female connector 100b'. Also, the male communication antenna 121a located near the upper surface 111a1' and the female communication antenna 121b located near the upper wall 112b1' are disposed such that these antennas can wirelessly communicate with each other. The male communication antenna 122a located near the upper surface 111a1' and the female communication antenna 122b located near the upper wall 112b1' are disposed such that these antennas can wirelessly communicate with each other. One of the male power-reception antennas 140a located near the upper surface 112a1' and one of the female power-transmission antennas 140b located near the upper wall 112b2' are disposed such that these antennas can wirelessly transfer power therebetween. The other male power-reception antenna 140a located near the lower surface 112a1' and the other female power-transmission antenna 140b located near the lower wall 112b2' are disposed such that these antennas can wirelessly transfer power therebetween. This is the connected state of the connection structure 100' in which the male connector 100a' is connected to the female connector 100b'.

The connection structure 100' has similar technical features as those of the connection structure 100 of Embodiment 1.

Embodiment 3

A male connector 200a according to Embodiment 3 of the invention will be described below with reference to FIG. 8A. The male connector 200a includes a male body 210a, a male communication antenna 221a, a male communication antenna 222a, two communication circuits (not shown), two male power-reception antennas 230a, two power-reception circuits 240a, a control unit 250a, a first male circuit board 261a, two second male circuit boards 262a, a third male circuit board 263a, and a cable (not shown). These components of the male connector 200a will be described below in detail. The Y-Y' direction shown in FIG. 8A corresponds to a radial direction of the male connector 200a and also the insertion/extraction direction of the male connector 200a. The Z-Z' direction shown in FIG. 8A corresponds to another radial direction of the male connector 200a.

Figure 8A:
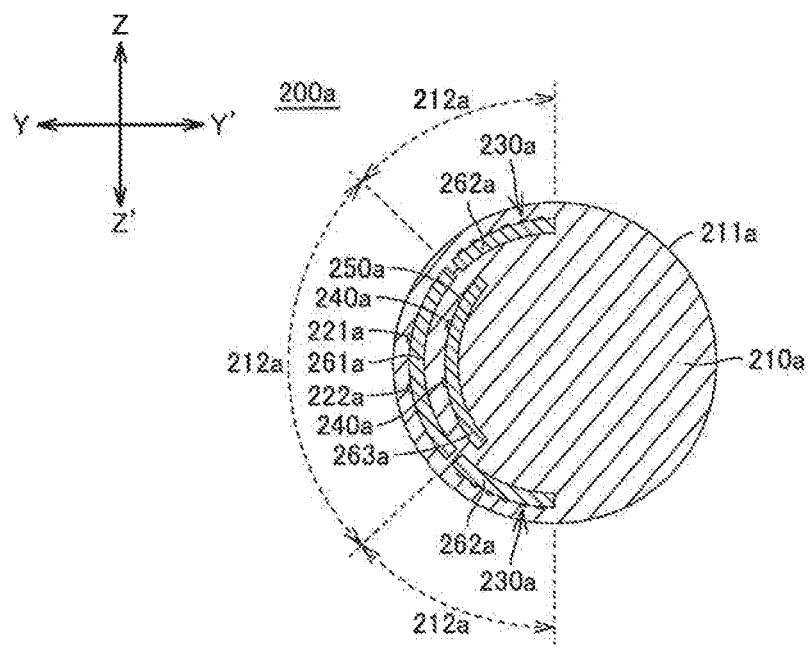
FIG. 8A is a schematic sectional view of a male connector according to Embodiment 3 of the invention.

As shown in FIG. 8A, the male body 210a is a spherical body of an insulating resin. The male body 210a is non-translucent (opaque). The male body 210a has a spherical outer surface 211a, which includes a plurality of outer surface regions 212a that do not overlap each other. For convenience of explanation, these outer surface regions 212a will be referred to as follows: the middle outer surface region as shown in FIG. 8A will be referred to as a middle surface region 212a; the outer surface region on the upper side as shown will be referred to as an upper surface region 212a; and the outer surface region on the lower side as shown will be referred to as a lower surface region 212a.

As shown in FIG. 8A, the first male circuit board 261a is a flexible printed circuit board or a PET circuit board, which is curved in arc shape along the outer surface 211a of the male body 210a. On the first male circuit board 261a mounted are the male communication antennas 221a and 222a and two communication circuits. The male communication antennas 221a and 222a are thus electrically connected to the first male circuit board 261a. The male communication antennas 221a and 222a have the same configuration as the male communication antennas 121a and 122a of Embodiment 1. The two communication circuits have the same configuration as the communication circuits 131a and 132a of Embodiment 1.

The first male circuit board 261a is integrally embedded inside the male body 210a such that the male communication antennas 221a and 222a are located near (e.g. at a distance in the range of a few millimeters to several tens of millimeters from) the middle surface region 212a of the male body 210a. In other words, the first male circuit board 261a is integrally embedded inside (covered with) the male body 210a at a point farther from the middle surface region 212a than the male communication antennas 221a and 222a are, and conversely the male communication antennas 221a and 222a are integrally embedded inside (covered with) the male body 210a at points closer to the middle surface region 212a than the first male circuit board 261a is. The first male circuit board 261a is substantially parallel to the middle surface region 212a.

The second male circuit boards 262a are flexible printed circuit boards or PET circuit boards, which are curved in arc shape along the outer surface 211a of the male body 210a. One of the male power-reception antennas 230a is provided on one of the second male circuit boards 262a, and the other male power-reception antenna 230a is provided on the other second male circuit board 262a. That is, the one of the male power-reception antennas 230a is electrically connected to the one of the second male circuit boards 262a, and the other male power-reception antenna 230a is electrically connected to the other second male circuit board 262a. The male power-reception antennas 230a have the same configuration as the male power-reception antennas 140a of Embodiment 1.

One of the second male circuit boards 262a is integrally embedded inside the male body 210a such that the one of the male power-reception antennas 230a is located near the upper surface region 212a of the male body 210a. In other words, the one of the second male circuit boards 262a is integrally embedded inside (covered with) the male body 210a at a point farther from the upper surface region 212a than the one of the male power-reception antenna 230a is, and conversely the one of the male power-reception antenna 230a is integrally embedded inside (covered with) the male body 210a at a point closer to the upper surface region 212a than the one of the second male circuit boards 262a is. The one of the second male circuit boards 262a may be substantially parallel, inclined, or orthogonal relative to the upper surface region 212a. The other second male circuit board 262a is integrally embedded inside the male body 210a such that the other male power-reception antenna 230a is located near the lower surface region 212a of the male body 210a. In other words, the other second male circuit board 262a is integrally embedded inside (covered with) the male body 210a at a point farther from the lower surface region 212a than the other male power-reception antenna 230a is, and conversely the other male power-reception antenna 230a is integrally embedded inside (covered with) the male body 210a at a point closer to the lower surface region 212a than the other second male circuit board 262a is. The other second male circuit board 262a may be substantially parallel, inclined, or orthogonal relative to the lower surface region 212a.

The third male circuit board 263a is a flexible printed circuit board or a PET circuit board. The third male circuit board 263a is integrally embedded inside (covered with) the male body 210a so as to be located closer to the center of the male body 210a than the first male circuit board 261a. The third male circuit board 263a is connected to the first male circuit board 261a via first connection means (not shown), such as pins, lead wires, or an FPC. The third male circuit board 263a is connected to the pair of second male circuit boards 262a via second connection means (not shown), such as pins, lead wires, or FPCs.

The power-reception circuits 240a have the same configuration as the power-reception circuits 150a of Embodiment 1. The power-reception circuits 240a are mounted on the third male circuit board 263a and integrally embedded inside (covered with) the male body 210a together with the third male circuit board 263a.

The control unit 250a has the same configuration as the control unit 160a of Embodiment 1. The control unit 250a is mounted on the third male circuit board 263a and integrally embedded inside (covered with) the male body 210a, together with the third male circuit board 263a.

The cable has the same configuration as the cable of Embodiment 1. Communication lines protruding from an end portion of the cable are connected to the third male circuit board 263a and thereby connected to the control unit 250a. Power lines protruding from the end portion of the cable are connected to the third male circuit board 263a and thereby connected to the power-reception circuits 240a. The one end portion of the cable (including the protruding communication lines and power lines) is integrally embedded inside the male body 210a. In other words, the portion other than the one end portion of the cable is led out of the male body 210a in the direction.

The male connector 200a as described above may be manufactured in the steps as detailed below. The manufacturing method may be the same as that for the male connector 100a of Embodiment 1, from the step of preparing the first male circuit board 261a, the pair of second male circuit boards 262a, and the third male circuit board 263a until just before the step of placing the first male circuit board 261a, the pair of second male circuit boards 262a, the third male circuit board 263a, the first and second connection means, and the one end portion of the cable in a cavity of a die (not shown).

The first male circuit board 261a, the pair of second male circuit boards 262a, the third male circuit board 263a, the first and second connection means, and the one end of the cable are placed in the cavity of the die (not shown) in the following arrangement. The first male circuit board 261a is fixed such that the first male circuit board 261a is substantially parallel to an area of a wall of the cavity corresponding to the middle surface region 212a, and that the male communication antennas 221a and 222a are disposed near the same area; the third male circuit board 263a is fixed in the cavity closer to the center of the cavity than the first male circuit board 261a; one of the second male circuit board 262a is fixed in the cavity of the die such that one of the male power-reception antennas 230a is located near an area of a wall of the cavity corresponding to the upper surface region 212a; and the other second male circuit board 262a is fixed in the cavity of the die such that the other male power-reception antenna 230a is located near an area of a wall of the cavity corresponding to the lower surface region 212a.

After that, insulating resin is injected and filled into the cavity of the die. The insulating resin then hardens to mold as the male body 210a with the inserted components embedded therein by insert-molding in the following arrangement. The first male circuit board 261a, the male communication antennas 221a and 222a, and the communication circuits are embedded such that the first male circuit board 261a is substantially parallel to the middle surface region 212a1 of the male body 210a, and that the male communication antennas 221a and 222a are disposed near the middle surface region 212a1 of the male body 210a; the third male circuit board 263a, the power-reception circuits 240a, and the control unit 250a are embedded such that the third male circuit board 263a is disposed closer to the center of the male body 210a than the first male circuit board 261a; one of the second male circuit boards 262a and one of the male power-reception antennas 230a are embedded such that the one of the male power-reception antennas 230a is disposed near the upper surface region 212a of the male body 210a; and the other second male circuit board 262a and the other male power-reception antenna 230a are embedded such that the other male power-reception antenna 230a is disposed near the lower surface region 212a of the male body 210a. This is how the male connector 200a is manufactured.

A female connector 200b according to Embodiment 3 of the invention will be described below with reference to FIG. 8B. The female connector 200b is connectable to the male connector 200a. The female connector 200b includes a female body 210b, a female communication antenna 221b, a female communication antenna 222b, two communication circuits (not shown), two female power-transmission antennas 230b, two power-transmission circuits 240b, a control unit 250b, a first female circuit board 261b, two second female circuit boards 262*b*, a third female circuit board 263*b*, a plurality of first external connection means (not shown), and a plurality of second external connection means (not shown). These components of the female connector 200*b* will be described below in detail. The Y-Y' direction shown in FIG. 8B corresponds to the direction in which the male connector 200*a* is inserted into and removed from the female connector 200*b*. The Z-Z' direction in FIG. 8B shown corresponds to the height direction of the female connector 200*b*.

Figure 8B:
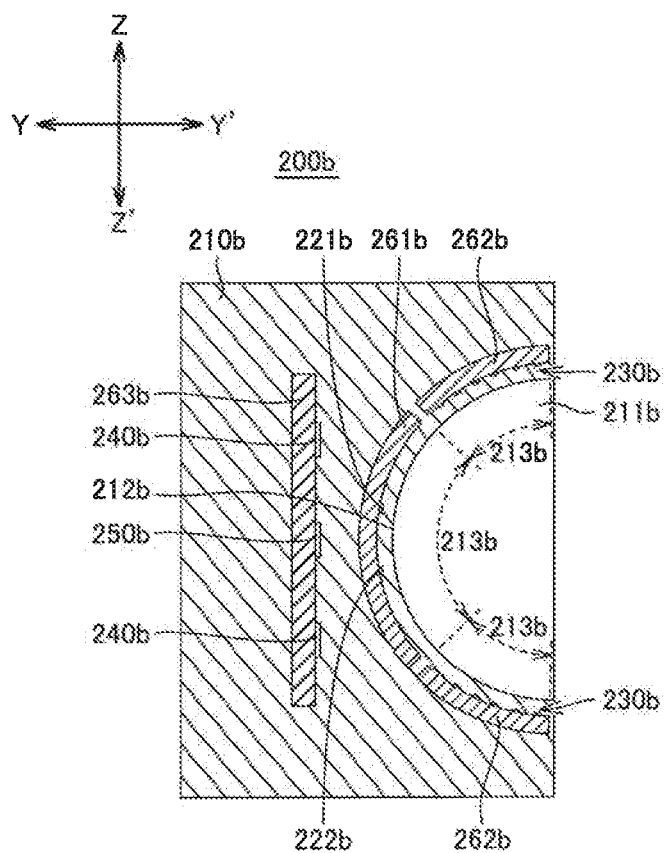
FIG. 8B is a schematic sectional view of a female connector according to Embodiment 3 of the invention.

The female body 210*b* as shown in FIG. 8B is made of an insulating resin. The female body 210*b* is non-translucent (opaque). The female body 210*b* has a connection hole 211*b*. The connection hole 211*b* is a hemispheric hole that conforms to the outer shape of the male connector 200*a* and is open in the Y' direction. The connection hole 211*b* is adapted to removably receive the male connector 200*a* in the Y-Y' direction. The male connector 200*a* can fit into the connection hole 211*b* so as to be fixed in the connection hole 211*b*. The connection hole 211*b* of the female body 210*b* has a hemispherical wall 212*b*, which includes a plurality of wall regions 213*b* that do not overlap each other. For convenience of explanation, these wall regions 213*b* will be referred to as follows: the middle region as shown in FIG. 8A will be referred to as a central wall region 213*b*; the region on the upper side as shown will be referred to as an upper wall region 213*b*; and the region on the lower side as shown will be referred to as a lower wall region 213*b*.

In the state where the male connector 200*a* fixedly fits in the connection hole 211*b* of the female connector 200*b* (this state will be hereinafter referred to as the connected state), the central wall region 213*b* can be opposed to the middle surface region 212*a* of the male connector 200*a*, the upper wall region 213*b* can be opposed to the upper surface region 212*a* of the male connector 200*a*, and the lower wall region 213*b* can be opposed to the lower surface region 212*a* of the male connector 200*a*.

The first female circuit board 261*b* is a flexible printed circuit board or a PET circuit board, which is curved along the wall 212*b* of the connection hole 211*b* of the female body 210*b*. On the first female circuit board 261*b* mounted are the female communication antennas 221*b* and 222*b* and the two communication circuits. The female communication antennas 221*b* and 222*b* are thus electrically connected to the first female circuit board 261*b*. The female communication antennas 221*b* and 222*b* have the same configuration as the female communication antennas 121*b* and 122*b* of Embodiment 1. The two communication circuits have the same configuration as the communication circuits 131*b* and 132*b* of Embodiment 1.

The first female circuit board 261*b* is integrally embedded inside the female body 210*b* such that the female communication antennas 221*b* and 222*b* are located near (e.g. at a distance in the range of a few millimeters to several tens of millimeters from) the central wall region 213*b* of the connection hole 211*b* of the female body 210*b*. In other words, the first female circuit board 261*b* is integrally embedded inside (covered with) the female body 210*b* at a point farther front the central wall region 213*b* than the female communication antennas 221*b* and 222*b* are, and conversely the female communication antennas 221*b* and 222*b* are integrally embedded inside (covered with) the female body 210*b* at points closer to the central wall region 213*b* than the first female circuit board 261*b* is. The first female circuit board 261*b* is substantially parallel to the central wall region 213*b*.

The second female circuit boards 262*b* are flexible printed circuit boards or PET circuit boards, which are curved in arc shape along the wall 212*b* of the connection hole 211*b* of the female body 210*b*. One of the female power-transmission antennas 230*b* is provided on one of the second female circuit boards 262*b*, and the other female power-transmission antenna 230*b* is provided on the other second female circuit board 262*b*. That is, the one of the female power-transmission antennas 230*b* is electrically connected to the one of the second female circuit boards 262*b*, and the other female power-transmission antenna 230*b* is electrically connected to the other second female circuit board 262*b*. The female power-transmission antennas 230*b* have the same configuration as the female power-transmission antennas 140*b* of Embodiment 1.

One of the second female circuit board 262*b* is integrally embedded inside the female body 210*b* such that one of the female power-transmission antennas 230*b* is located near the upper wall region 213*b* of the female body 210*b*. In other words, the one of the second female circuit boards 262*b* is integrally embedded inside (covered with) the female body 210*b* at a point farther from the upper wall region 213*b* than the one of the female power-transmission antennas 230*b* is, and conversely the one of the female power-transmission antenna 230*b* is integrally embedded inside (covered with) the female body 210*b* at a point closer to the upper wall region 213*b* than the one of the second female circuit boards 262*b* is. The one of the second female circuit boards 262*b* may be substantially parallel, inclined, or orthogonal relative to the upper wall region 213*b*. The other second female circuit board 262*b* is integrally embedded inside the female body 210*b* such that the other female power-transmission antenna 230*b* is located near the lower wall region 213*b* of the female body 210*b*. In other words, the other second female circuit board 262*b* is integrally embedded inside (covered with) the female body 210*b* at a point farther from the lower wall region 213*b* than the other female power-transmission antenna 230*b* is, and conversely the other female power-transmission antenna 230*b* is integrally embedded inside (covered with) the female body 210*b* at a point closer to the lower wall region 213*b* than the other second female circuit board 262*b* is. The other second female circuit board 262*b* may be substantially parallel, inclined, or orthogonal relative to the lower wall region 213*b*.

The third female circuit board 263*b* is a rigid printed circuit board, a flexible printed circuit board, or a PET circuit board. The third female circuit board 263*b* is integrally embedded inside (covered with) the female body 210*b* so as to be located on the Y-direction side of the first female circuit board 261*b* of the female body 210*b*. The third female circuit board 263*b* is connected to the first female circuit board 261*b* via first connection means (not shown), such as pins, lead wires, or an FPC. The third female circuit board 263*b* is connected to the pair of second female circuit boards 262*b* via second connection means (not shown), such as pins, lead wires, or FPCs.

The power-transmission circuits 240*b* have the same configuration as the power-transmission circuits 150*b* of Embodiment 1. The power-transmission circuits 240*b* are mounted on the third female circuit board 263*b* and integrally embedded inside (covered with) the female body 210*b* together with the third female circuit board 263*b*.

The control unit 250*b* has the same configuration as the control unit 160*b* of Embodiment 1. The control unit 250*b* is mounted on the third female circuit board 263*b* and integrally embedded inside (covered with) the female body 210*b* together with the third female circuit board 263*b*.

The first external connection means have the same configuration as the first external connection means of Embodiment 1. The second external connection means have the same configuration as the second external connection means of Embodiment 1.

The female connector 200b as described above may be manufactured in the steps as detailed below. The manufacturing method may be the same as that for the female connector 200b of Embodiment 1, from the step of preparing the first female circuit board 261b, the pair of second female circuit boards 262b, and the third female circuit board 263b until just before the step of placing the first female circuit board 261b, the pair of second female circuit boards 262b, the third female circuit board 263b, the first and second connection means, and the first and second external connection means other than their rear portions in a cavity of a die (not shown).

The first female circuit board 261b, the pair of second female circuit boards 262b, the third female circuit board 263b, the first and second connection means, and the first and second external connection means other than their rear portions are placed in the cavity of the die (not shown) in the following arrangement. The first female circuit board 261b is fixed such that the first female circuit board 261b is substantially parallel to an area of a hemispherical convex portion in the cavity corresponding to the middle surface region 212a, and that the female communication antennas 221b and 222b are disposed near the same area; the third female circuit board 263b is fixed so as to be located on the Y-direction side of the first female circuit board 261b; one of the second female circuit boards 262b is fixed such that one of the female power-transmission antennas 230b is located near an area of the convex portion of the die corresponding to the upper surface region 212a; and the other second female circuit board 262b is fixed in the cavity of the die such that the other female power-transmission antenna 230b is located near an area of the convex portion of the die corresponding to the lower surface region 212a.

After that, insulating resin is injected and filled into the cavity of the die. The insulating resin then hardens to mold as the female body 210b. The projection of the die serves to form the connection hole 211b of the female body 210b. The inserted components are embedded by insert-molding in the female body 210b in the following arrangement. The first female circuit board 261b, the female communication antennas 221b and 222b, and the communication circuits 131b and 132b are embedded such that the first female circuit board 261b is substantially parallel to the central wall region 213b of the connection hole 211b of the female body 210b, and that the female communication antennas 221b and 222b are disposed near the central wall region 213b of the female body 210b; one of the second female circuit boards 262b and one of the female power-transmission antennas 230b are embedded such that the one of the female power-transmission antennas 230b is disposed near the upper wall region 213b of the connection hole 211b of the female body 210b; the other second female circuit board 262b and the other female power-transmission antenna 230b are embedded such that the other female power-transmission antenna 230b is disposed near the lower wall region 213b of the connection hole 211b of the female body 210b; and the third female circuit board 263b, the power-transmission circuits 240b, and the control unit 250b are embedded such that the third female circuit board 263b is disposed on the Y-direction side of the first female circuit board 261b. This is how the female connector 200b is manufactured.

Figure 9:
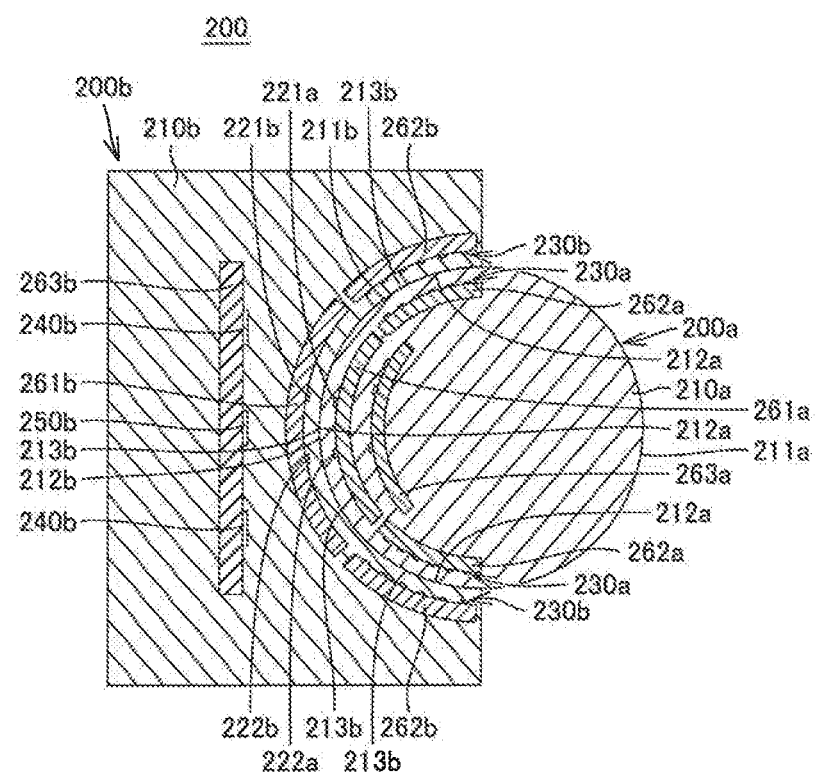
FIG. 9 is a sectional view of a connection structure of the male connector and the female connector according to Embodiment 3 of the invention.

A connection structure 200 according to Embodiment 3 of the invention includes the male connector 200a and the female connector 200b as described above. As shown in FIG. 9, when the male connector 200a is connected to the female connector 200b, the male connector 200a fits into the connection hole 211b of the female connector 200b so as to be fixed in position in the connection hole 211b of the female connector 200b. More particularly, as described above, the outer surface regions 212a of the male connector 200a are opposed substantially in parallel to the respective wall regions 213b of the connection hole 211b of the female connector 200b; the male communication antenna 221a located near the middle surface region 212a and the female communication antenna 221b located near the central wall region 213b are disposed such that these antennas can wirelessly communicate with each other; the male communication antenna 222a located near the middle surface region 212a and the female communication antenna 222b located near the central wall region 213b are disposed such that these antennas can wirelessly communicate with each other; the one of the male power-reception antennas 230a located near the upper surface region 212a and the one of the female power-transmission antennas 230b located near the upper wall region 213b are disposed such that these antennas can wirelessly transfer power therebetween; and the other male power-reception antenna 230a located near the lower surface region 212a and the other female power-transmission antenna 230b located near the lower wall region 213b are disposed such that these antennas can wirelessly transfer power therebetween. This is the connected state of the connection structure 200 in which the male connector 200a is connected to the female connector 200b.

The connection structure 200 has similar technical features as those of the connection structure 100 of Embodiment 1.

The male connector, the female connector, and connection structure therebetween of the invention are not limited to those of the embodiments but may be modified in any manner within the scope of the claims. Specific modifications will be described below in detail.

The male connector of the invention may be any connector including a male body, a male communication antenna that is provided inside the male body and can wirelessly communicate a signal, and a first male circuit board electrically connected to the male communication antenna.

For example, the male connector may include a male body, a plurality of male communication antennas, and a plurality of first male circuit boards. In this case, at least one of the male communication antennas may be provided on each of the first male circuit boards. The first male circuit boards may be integrally embedded inside the male body by insert-molding, or housed in a housing space (to be described) of the male body, such that at least one of the male communication antennas on one of the first male circuit boards is provided near one of the outer surface regions of the male body and that another at least one of the male communication antennas on another one of the first male circuit boards is provided near another one of the outer surface regions of the male body.

Alternatively, the male connector may include a male body, a plurality of male communication antennas, and a first male circuit board having a plurality of first male portions. In this case, at least one of the male communication antennas may be provided on each of the first male portions. The first male portions may be integrally embedded inside the male body by insert-molding, or housed in a housing space of the male body, such that at least one of the male communication antennas on one of the first male portions is provided near one of the outer surface regions of the male body and that another at least one of the male communication antennas on another one of the first male portions is provided near another one of the outer surface regions of the male body. For example, the first male circuit board may be a rigid flexible circuit board, a flexible printed circuit board, or a PET circuit board. Such a first male circuit board can be bent or curved such that the first male portions thereof are embedded inside the male body by insert-molding or housed in a housing space of the male body, that at least one of the male communication antennas on one of the first male portions is provided near one of the outer surface regions of the male body, and that another at least one of the male communication antennas on another one of the first male portions is provided near another one of the outer surface regions of the male body.

Still alternatively, the male connector may include a male body, a male communication antenna, a male power-reception/transmission antenna, and a first male circuit board having a first male portion and a second male portion in the following arrangement. The male communication antenna is provided on the first male portion; the male power-reception/transmission antenna is provided on the second male portion, not on the second male circuit board as in the above-described embodiments; the first male portion is integrally embedded inside the male body by insert-molding or housed in a housing space of the male body such that the male communication antenna is located near one of the outer surface regions of the male body; and the second male portion, together with the male power-reception/transmission antenna, is integrally embedded inside the male body by insert-molding or housed in a housing space of the male body.

Further, the second male portion may be integrally embedded inside the male body by insert-molding or housed in a housing space of the male body such that the male power-reception/transmission antenna is located near another one of the outer surface regions other than the outer surface region near the male communication antenna. In this case, the first male circuit board may be a rigid flexible circuit board, a flexible printed circuit board, or a PET circuit board. Such a first male circuit board can be bent or curved such that the first male portion thereof is integrally embedded inside the male body by insert-molding or housed in a housing space of the male body, and that the male communication antenna is located near an outer surface region of the male body. On the other hand, the second male portion of the first male circuit board may be integrally embedded inside the male body by insert-molding or housed in a housing space of the male body such that the male power-reception/transmission antenna is located near another one of the outer surface regions other than the outer surface region near the male communication antenna.

The male body of the invention may be any body inside which at least a male communication antenna is provided. For example, there may be at least one housing space inside the male body. The housing space(s) may house at least a male communication antenna, which may not be exposed from the male body. The male body 110a, 110a' as described above may be modified to have at least one housing space. The housing space(s) may house the male communication antennas 121a and 122a, the communication circuits 131a and 132a, the male power-reception antennas 140a, the power-reception circuits 150a, the control unit 160a, the first male circuit board 171a, the second male circuit boards 172a, and the third male circuit board 173a. Alternatively, at least one of the male communication antennas 121a and 122a and the male power-reception antennas 140a may be embedded inside the male body 110a, 110a' by insert-molding as in the embodiments, while the remainder of the male communication antennas 121a and 122a and the male power-reception antennas 140a, the communication circuits 131a and 132a, the power-reception circuits 150a, the control unit 160a, the first male circuit board 171a, the second male circuit boards 172a and third male circuit board 173a may be housed in the housing space(s) of the male body 110a, 110a'. In this case, the antenna(s) to be insert-molded into the male body 110a, 110a' may be a coil or terminal (to be described), which may be connected to the associated circuit board in the housing space(s) via connection means such as lead wires or FPCs. Still alternatively, the male communication antennas 121a and 122a, the communication circuits 131a and 132a, and the first male circuit board 171a may be embedded inside the male body 110a, 110a' by insert-molding as in the above embodiments, while the male power-reception antennas 140a, the power-reception circuits 150a, the control unit 160a, the second male circuit boards 172a, and the third male circuit board 173a may be housed in the housing space(s) in the male body 110a, 110a'. In this case, the male communication antennas 121a and 122a may be conductors, coils, or terminals. Still alternatively, the male power-reception antennas 140a and second male circuit boards 172a may be embedded inside the male body 110a, 110a' by insert-molding as in the embodiments, while the male communication antennas 121a and 122a, the communication circuits 131a and 132a, the first male circuit board 171a, the power-reception circuits 150a, the control unit 160a, and the third male circuit board 173a may be housed in the housing space(s) in the male body 110a, 110a'. In this case, the male power-reception antennas 140a may be conductors, coils, or terminals. Still alternatively, the male communication antennas 121a and 122a, the communication circuits 131a and 132a, the first male circuit board 171a, the male power-reception antennas 140a, and the second male circuit boards 172a may be embedded inside the male body 110a, 110a' by insert-molding as in the embodiments, while the power-reception circuits 150a, the control unit 160a, the second male circuit boards 172a, and the third male circuit board 173a may be housed in the housing space(s) in the male body 110a, 110a'. In this case, the male communication antennas 121a and 122a and/or the male power-reception antennas 140a may be conductors, coils, or terminals. One of the advantages in disposing any of the antennas and/or the circuit boards in the housing space(s) of the male body is that there is no need to consider the effect of resin flowing onto the antennas and/or the circuit boards when insert-molding them in the male body, thereby increasing the flexibility in the shape and arrangement of the antennas and/or the circuit boards. The male body 210a may also be modified in similar manners to the male body 110a or 110a'.

The male body of the invention may have any outer shape adapted to be received in a connection hole of the female connector. For example, the male body may include insulating resin in the shape of polyhedron (e.g. polygonal column or polygonal pyramid), hemisphere, bombshell, circular cylinder, or truncated cone.

The outer surface regions of the male body of the invention may be any non-overlapping regions of any outer surface or surfaces of the male body. If the male body is in the shape of polyhedron, circular cylinder, or truncated cone, a plurality of outer surfaces of polyhedron, the circular cylinder, or the truncated cone shape may serve as outer surface regions, or at least one outer surface may include a plurality of non-overlapping outer surface regions. If the male body is in the shape of hemisphere or bombshell, its round outer surface may include a plurality of non-overlapping outer surface regions. Further, the male body may include a first body and a second body contiguous with each other, and the second body may have a larger or smaller outer shape than the first body. The first and second bodies may each be insulating resin in the shape of polyhedron (e.g. polygonal column or polygonal pyramid), hemisphere, bombshell, circular cylinder, or truncated cone. At least one of the first and second bodies may have a plurality of outer surface regions. Also in this case, a plurality of outer surfaces of at least one of the first and second bodies may serve as outer surface regions, or at least one surface of the first and second bodies may include a plurality of non-overlapping outer surface regions. The male body of the invention may be visually transparent.

The male communication antenna of the invention may be any antenna that is capable of communicating signals wirelessly and electrically connected to the first male circuit board. For example, the male communication antenna of any of the embodiments and the modified examples as described may be provided on the first male circuit board, or may be electrically connected to the first male circuit board via known connection means. At least one of the male communication antennas of the embodiments or the modification examples may be integrally embedded inside the male body by insert-molding or housed in a housing space of the male body so as to be located near one of the outer surface regions of any of the embodiments or the modification examples. The male communication antenna(s) of the invention may be a communication antenna(s) for transmission or for reception. The male communication antenna(s) of the invention may preferably be a conductor, a coil, or a terminal (e.g. machined metal plate) but not limited thereto. The conductor may be formed on the first male circuit board or on an inner wall of a housing space of the male body.

The communication circuits of the male connector are not essential to the invention. The communication circuits of the male connector of the invention may be modified in any manner as long as it is connected to a male communication antenna of any one of the above-described aspects and can wirelessly transmit or receive signals using the male communication antenna. For example, the communication circuit(s) of the male connector may be electrically connected to a circuit board other than the first male circuit board. The communication circuit(s) may be omitted in the male connector and may be provided outside the male connector instead. In this case, the communication circuit(s) may be connected via known connection means to a male communication antenna of any one of the above-described aspects.

The male power-reception antennas are not essential to the invention. The male power-reception antenna of the invention may be modified in any manner as long as it is electrically connected to a first male circuit board or a second male circuit board and integrally embedded inside the male body by insert-molding or housed in a housing space of the male body. For example, the male power-reception antenna of any of the embodiments and the modification examples may be provided on a second male portion of the first male circuit board or on the second male circuit board, or may be electrically connected to the first male circuit board or the second male circuit board via known connection means. At least one of the male power-reception antennas of the embodiments and the modification examples may be integrally embedded inside the male body by insert-molding or housed in a housing space of the male body so as to be located near another one of the outer surface regions, of any of the embodiments and the modification examples, other than the outer surface region, of any of the embodiments and the modification examples, near the male communication antenna. The male power-reception antenna, if housed in a housing space of the male body, is not exposed from the male body.

The male power-reception antennas of any of the above-described aspects may be replaced with a male power-transmission antenna(s) that can wirelessly transmit electric power. The male power-transmission antenna of the invention only needs to be electrically connected to the first male circuit board or the second male circuit board. For example, the male power-transmission antenna may be provided on the second male portion of the first male circuit board or on the second male circuit board, or may be electrically connected via known connection means to the first male circuit board or the second male circuit board. At least one of the male power-transmission antennas of the invention may be integrally embedded inside the male body by insert-molding or housed in a housing space of the male body so as to be located near another one of the outer surface regions, of any of the embodiments and the modification examples, other than the outer surface region, of any of the embodiments and the modification examples, near the male communication antenna. The male connector of the invention, if including a male power-reception antenna(s) in place of the male power-transmission antennas, may include a power-transmission circuits) in place of the power-reception circuits. The power-transmission circuit(s) may be provided on the second male portion of the first male circuit board, the second male circuit board, or the third male circuit board. The male connector of the invention may include both the male power-reception antenna(s) and the male power-transmission antenna(s) of any of the above-described aspects. The male power-reception/transmission antenna(s) of the invention may preferably be a conductor, a coil, or a terminal (e.g. a machined metal plate) but not limited thereto. The conductor may be formed on the second male portion of the first male circuit board, the second male circuit board, or a wall of a housing space of the male body.

The power-reception circuits and/or the power-transmission circuits of the male connector are not essential to the invention. The power-reception circuit(s) of the male connector of the invention may be modified in any manner as long as it can direct the male power-reception antenna(s) of any of the above-described aspects to wirelessly receive electric power. For example, the power-reception circuit(s) may be mounted on at least one of the second male portion of the first male circuit board, the second male circuit board, and the third male circuit board. The power-reception circuits) may be omitted in the male connector and may be provided outside the male connector instead. In this case, the power-reception circuits) may be connected via known connection means to a male power-reception antenna(s) of any of the above-described aspects. The power-transmission circuits) of the male connector of the invention may be modified in any manner as long as it can direct the male power-transmission antenna(s) of any of the above-described aspects to wirelessly transfer electric power. For example, the power-transmission circuit(s) may be mounted on at least one of the second male portion of the first male circuit board, the second male circuit boards, and the third male circuit board. The power-transmission circuit(s) may be omitted in the male connector and may be provided outside the male connector instead. In this case, the power-transmission circuit(s) may be connected via known connection means to the male power-transmission antenna(s) of any of the above-described aspects via known connection means.

The first male circuit board of the invention may be disposed outside the male body of any of the embodiments and the modification examples and fixed to the male body. The first male circuit board of the invention may be provided inside the male body of any of the embodiments and the modification examples. The first male circuit board, if provided thereon with the male communication antenna(s) of any of the above-described aspects, may be integrally embedded inside the male body by insert-molding or housed in a housing space of the male body such that the male communication antenna(s) is located near one of the outer surface regions of any of the above-described aspects. The first male circuit board may be substantially parallel, inclined, or orthogonal relative to any of the outer surface regions. The first male portion(s), if any, of the first male circuit board of the invention may be provided inside the male body of any of the embodiments and the modification examples. The first male portion, if provided thereon with the male communication antenna(s) of any of the above-described aspects, may be integrally embedded inside the male body by insert-molding or housed in a housing space of the male body such that the male communication antenna(s) is located near one of the outer surface regions of any of the above-described aspects. The first male portion may be substantially parallel, inclined, or orthogonal relative to any of the outer surface regions.

The second male circuit boards of the invention may be omitted if, as described above, the male power-reception/transmission antenna(s) is provided on the second male portion of the first male circuit board or if the male power-reception/transmission antennas are omitted. The second male circuit board(s) of the invention may be provided outside the male body of any of the embodiments and the modification examples and fixed to the male body. The second male circuit board(s) of the invention may be provided inside the male body of any of the embodiments and the modification examples. The second male circuit board, if provided thereon with the male power-reception/transmission antennas) of any of the above-described aspects, may be provided inside the male body such that the male power-reception/transmission antenna(s) is located near another one of the outer surface regions, of any of the embodiments and the modification examples, other than the outer surface region, of any of the embodiments and the modification examples, near the male communication antenna(s). At least one second male circuit board should be provided for the invention.

The third male circuit board is not essential to the invention. The control unit of the male connector is not essential to the invention, either. The third male circuit board and/or the control unit may be disposed outside the male connector. In this case, the third male circuit board and/or the control unit may be connected via known connection means to the communication circuit(s), the power-reception circuit(s), and/or the power-transmission circuit(s) as described above. The control unit may be provided on a circuit board, other than the third male circuit board, inside the male body.

The cable of the male connector is not essential to the invention. The male connector of the invention may include first and/or second external connection means in place of the cable. The first external connection means, which may be terminals, pins, or a flexible circuit board for signal communication, may include a front portion and a rear portion. The first external connection means excluding its rear portion (and including its connection portion) may be embedded by insert-molding inside the male body of any of the above-described aspects. In other words, the rear portion of the first external connection means may protrude from the male body. The front portion of the first external connection means may be connected to the communication circuit(s) via the first male circuit board, or to the control unit via the third male circuit board or via another circuit board. The second external connection means, which may be terminals, pins, or a flexible circuit board for power transfer, may include a front portion and a rear portion. The second external connection means excluding its rear portion (and including its connection portion) may be embedded by insert-molding inside the male body of any of the above-described aspects. In other words, the rear portion of the second external connection means protrudes from the male body. The front portion of the second external connection means may be connected to the power-reception circuit(s) or the power-transmission circuit(s) via the second male portion of the first male circuit board, the second male circuit board, or the third male circuit board.

The male connector of the invention may further include a shield case for covering the male body. The male connector of the invention may further include a shield member(s) to be disposed between the first male circuit board and the second male circuit board(s), between the first male circuit board and the third male circuit board, and/or between the second male circuit board(s) and the third male circuit board. The male connector of the invention may further include a male-side engaging portion. When the male connector is received in the connection hole of the female connector, the male-side engaging portion may engage with a female-side engaging portion of the female connector. One of the male-side engaging portion and the female-side engaging portion may be an engaging projection, and the other may be an engaging hole to be engaged with the engaging projection.

The female connector of the invention may be any connector including a female body having a connection hole, a female communication antenna that is provided inside the female body and can wirelessly communicate a signal, and a first female circuit board electrically connected to the female communication antenna.

For example, the female connector may include a female body, a plurality of female communication antennas, and a plurality of first female circuit boards. In this case, at least one of the female communication antennas is provided on each of the first female circuit board. The first female circuit boards are integrally embedded inside the female body by insert-molding, or housed in a housing space (to be described) of the female body, such that at least one of the female communication antennas on one of the first female circuit boards is located near one of the wall regions of the connection hole of the female body and that another at least one of the female communication antennas on another one of the first female circuit boards is located near another one of the wall regions of the connection hole of the female body.

Alternatively, the female connector may include a female body, a plurality of female communication antennas, and a first female circuit board having a plurality of female first portions. At least one of the female communication antennas is provided on each of the first female portions. The first female portions are integrally embedded inside the female body by insert-molding, or housed in a housing space of the female body, such that at least one of the female communication antennas on one of the first female portions is located near one of the wall regions of the connection hole of the female body and that another at least one of the female communication antennas on another one of the first female portions is located near another one of the wall regions of the connection hole of the female body. For example, the first female circuit board may be a rigid flexible circuit board, a flexible printed circuit board, or a PET circuit board. Such a first female circuit board can be bent or curved such that the first female portions thereof are embedded inside the female body by insert-molding or housed in a housing space of the female body, that at least one of the female communication antennas on one of the first female portions is located near one of the wall regions of the connection hole of the female body; and that another at least one of the female communication antennas on another one of the first female portions is located near another one of the wall regions of the connection hole of the female body.

Still alternatively, the female connector may include a female body, a female communication antenna, a female power-transmission/reception antenna, and a first female circuit board having a first female portion and a second female portion in the following arrangement. The female communication antenna is provided on the first female portion; the female power-transmission/reception antenna is provided on the second female portion, not on the second female circuit board as in the above-described embodiments; the first female portion is integrally embedded inside the female body by insert-molding or housed in a housing space of the female body such that the female communication antenna is located near one of the wall regions of the connection hole of the female body; and the second female portion, together with the female power-transmission/reception antenna, is integrally embedded inside the female body by insert-molding or housed in a housing space of the female body.

Further, the second female portion may be integrally embedded inside the female body by insert-molding or housed in a housing space of the female body such that the female power-transmission/reception antenna is located near another one of the wall regions of the connection hole of the female body other than the wall region near the female communication antenna. In this case, the first female circuit board may be a rigid flexible circuit board, a flexible printed circuit board, or a PET circuit board. Such a first female circuit board can be bent or curved such that the first female portion thereof is embedded inside the female body by insert-molding or housed in a housing space of the female body, and that the female communication antenna is located near a wall region of the female body. On the other hand, the second female portion of the first female circuit board may be embedded inside the female body by insert-molding or housed in a housing space of the female body such that the female power-transmission/reception antenna is located near another one of the wall regions other than the wall region near the female communication antenna.

The female body of the invention may be any body inside which at least a female communication antenna is provided. For example, there may be at least one housing space inside the female body. The housing space(s) may house at least a female communication antenna, which may not be exposed from the female body. The female bodies 110*b* and 110*b*' may be modified to have at least one housing space. The housing space(s) may house the female communication antennas 121*b* and 122*b*, the communication circuits 131*b* and 132*b*, the female power-transmission antennas 140*b*, the power-transmission circuits 150*b*, the control unit 160*b*, the first female circuit board 171*b*, the second female circuit boards 172*b*, and the third female circuit board 173*b*. Alternatively, at least one of the female communication antennas 121*b* and 122*b* and the female power-transmission antennas 140*b* may be embedded inside the female body 110*b*, 110*b*' by insert-molding as in the embodiments, while the remainder of the female communication antennas 121*b* and 122*b* and the female power-transmission antennas 140*b*, the communication circuits 131*b* and 132*b*, the power-transmission circuits 150*b*, the control unit 160*b*, the first female circuit board 171*b*, the second female circuit boards 172*b*, and the third female circuit board 173*b* may be housed in the housing space(s) in the female body 110*b*, 110*b*'. In this case, the antenna(s) to be insert-molded into the female body 110*b*, 110*b*' may be a coil or terminal (to be described), which may be connected to the associated circuit board in the housing space(s) via connection means such as lead wires or FPCs. Still alternatively, the female communication antennas 121*b* and 122*b*, the communication circuits 131*b* and 132*b*, and the first female circuit board 171*b* may be embedded inside the female body 110*b*, 110*b*' by insert-molding as in the embodiments, while the female power-transmission antennas 140*b*, the power-transmission circuits 150*b*, the control unit 160*b*, the second female circuit boards 172*b*, and the third female circuit board 173*b* may be housed in the housing space(s) in the female body 110*b*, 110*b*'. In this case, the female communication antennas 121*b* and 122*b* may be conductors, coils, or terminals. Still alternatively, the female power-transmission antennas 140*b* and the second female circuit boards 172*b* may be embedded inside the female body 110*b*, 110*b*' by insert-molding as in the embodiments, while the female communication antennas 121*b* and 122*b*, the communication circuits 131*b* and 132*b*, the first female circuit board 171*b*, the power-transmission circuits 150*b*, the control unit 160*b*, and the third female circuit board 173*b* may be housed in the housing space(s) in the female body 110*b*, 110*b*'. In this case, the female power-transmission antennas 140*b* may be conductors, coils, or terminals. Still alternatively, the female communication antennas 121*b* and 122*b*, the communication circuits 131*b* and 132*b*, the first female circuit board 171*b*, the female power-transmission antennas 140*b*, and the second female circuit boards 172*b* may be embedded inside the female body 110*b*, 110*b*' by insert-molding as in the embodiments, while the power-transmission circuits 150*b*, the control unit 160*b*, the second female circuit boards 172*b*, and the third female circuit board 173*b* may be housed in the housing space(s) in the female body 110*b*, 110*b*'. In this ease, the female communication antennas 121*b* and 122*b* and/or the female power-transmission antennas 140*b* may be conductors, coils, or terminals. One of the advantages in disposing any of the antennas and/or the circuit boards in the housing space(s) of the female body is that there is no need to consider the effect of resin flowing onto the antennas and/or the circuit boards when insert-molding them inside the female body, thereby increasing the flexibility in the shape and arrangement of the antennas and/or the circuit boards. The female body 210*b* may also be modified in similar manners to the female bodies 110*b* and 110*b*'.

The female body of the invention may have any outer shape. The connection hole of the female body of the invention may have any shape adapted to receive and fixedly position the male connector of any of the above-described aspects. For example, the connection hole may include a hole in the shape of polyhedron (e.g. polygonal column or polygonal pyramid), hemisphere, bombshell, circular cylinder, or truncated cone.

The wall regions of the connection hole of the female body of the invention may be any non-overlapping regions of wall or walls of the connection hole of the female body. If the connection hole is in the shape of polyhedron, circular cylinder, or truncated cone, a plurality of walls of the connection hole may serve as wall regions, or at least one wall may include a plurality of non-overlapping wall regions. If the connection hole is in the shape of hemisphere or bombshell, its round wall may include a plurality of non-overlapping wall regions. Further, the connection hole of the female body may include a first connection hole and a second connection hole in communication with each other, and the second connection hole may have a larger or smaller outer shape than larger than the first connection hole. In this case, at least one of the first and second connection holes may have a plurality of wall regions. The first and second connection holes may each be a hole in the shape of polyhedron (e.g. polygonal column or polygonal pyramid), hemisphere, bombshell, circular cylinder, or truncated cone. Also in this case, a plurality of walls of at least one of the first and second connection holes may serve as wall regions, or at least one wall may include a plurality of non-overlapping wall regions. The female body of the invention may be visually transparent.

The female communication antenna of the invention may be any antenna that is capable of communicating signals wirelessly and electrically connected to the first female circuit board. For example, the female communication antenna of any of the embodiments and the modification examples may be provided on the first female circuit board, or may be electrically connected to the first female circuit board via known connection means. At least one female communication antenna of the embodiments and the modification examples may be integrally embedded inside the female body by insert-molding or housed in a housing space of the female body so as to be located near one of the wall regions of any of the embodiments and the modification examples. The female communication antenna(s) of the invention may be a communication antenna(s) for transmission or for reception. The female communication antenna(s) of the invention may preferably be a conductor, a coil, or a terminal (e.g. machined metal plate) but not limited thereto. The conductor may be formed on the first female circuit board or an inner wall of a housing space of the female body.

The communication circuits of the female connector of the invention are not essential to the invention. The communication circuit of the female connector of the invention may be modified in any manner as long as it can wirelessly transmit or receive signals using the female communication antenna of any of the above-described aspects. For example, the communication circuit(s) of the female connector may be electrically connected to a circuit board other than the first female circuit board. The communication circuit(s) may be omitted in the female connector and may be provided outside the female connector instead. In this case, the communication circuit(s) may be connected via known connection means to a female communication antenna of any of the above-described aspects.

The female power-transmission antennas of the invention are not essential to the invention. The female power-transmission antenna of the invention may be modified in any manner as long as it is electrically connected to a first female circuit board or a second female circuit board and integrally embedded inside the female body by insert-molding or housed in a housing space of the female body. For example, the female power-transmission antenna of any of the embodiments and the modification examples may be provided on a second female portion of the first female circuit board or on the second female circuit board, or may be electrically connected to the first female circuit board or the second female circuit board via known connection means. At least one of the female power-transmission antenna of the embodiments and the modification examples may be integrally embedded inside the female body by insert-molding or housed in a housing space of the female body so as to be located near another one of the wall regions, of any of the embodiments and the modification examples, other than the wall region, of any of the embodiments and the modification examples, near the female communication antenna. The female power-transmission antenna, if housed in a housing space of the female body, is not exposed from the female body.

The female power-transmission antennas of any of the above-described aspects may be replaced with a female power-reception antenna(s) that can wirelessly receive electric power. The female power-reception antenna of the invention only needs to be electrically connected to the first female circuit board or the second female circuit board. For example, the female power-reception antenna may be provided on the second female portion of the first female circuit board or the second female circuit board, or may be electrically connected via known connection means to the first female circuit board or the second female circuit board. At least one of the female power-reception antennas of the invention may be embedded inside the female body by insert-molding or housed in a housing space of the female body so as to be located near another one of the wall regions, of any of the embodiments and the modification examples, other than the wall region, of any of the embodiments and the modification examples, near the female communication antenna. The female connector of the invention, if including a female power-reception(s) antenna in place of the female power-transmission antennas, may include a power-reception circuit(s) in place of the power-transmission circuits. The power-reception circuit(s) may be provided on the second female portion of the first female circuit board, the second female circuit board, or the third female circuit board. The female connector of the invention may include both the female power-transmission antenna(s) and the female power-reception antenna(s) of any of the above-described aspects. The female power-transmission/reception antennas) of the invention may be a conductor, a coil, or a terminal (e.g. a machined metal plate) but not limited thereto. The conductor may be formed on the second female portion of the first female circuit board, the second female circuit board, or a wall of the housing space of the female body.

The power-transmission circuits of female connector of the invention is not essential to the invention. The power-transmission circuit(s) of the female connector of the invention may be modified in any manner as long as it can direct the female power-transmission antenna(s) of any of the above-described aspects to wirelessly transmit electric power. For example, the power-transmission circuit(s) may be mounted on at least one of the second female portion of the first female circuit board, the second female circuit boards, and the third female circuit board. The power-transmission circuit may be omitted in the female connector and may be provided outside the female connector instead. In this case, the power-transmission circuit(s) may be connected via known connection means to the female power-transmission antennas) of any of the above-described aspects. The power-reception circuits of the female connector of the invention may be modified in any manner as long as it can direct the female power-reception antennas) of any of the above-described aspects to wirelessly receive electric power. For example, the power-reception circuit(s) may be mounted on at least one of the second female portion of the first female circuit board, the second female circuit boards, and the third female circuit board. The power-reception circuit(s) may be omitted in the female connector and may be provided outside the female connector instead. In this case, the power-reception circuit(s) may be connected via known connection means to the female power-reception antennas) of any of the above-described aspects.

The first female circuit board of the invention may be disposed outside the female body of any of the embodiments and the modification examples and fixed to the female body. The first female circuit board of the invention may be provided inside the female body of any of the embodiments and the modification examples. The first female circuit board, if provided thereon with the female communication antenna(s) of any of the above-described aspects, may be embedded inside the female body by insert-molding or housed in a housing space of the female body such that the female communication antennas) is located near one of the wall regions. The first female circuit board may be substantially parallel, inclined, or orthogonal relative to any of the wall regions. The first female portion(s), if any, of the invention may be provided inside the female body of any of the embodiments and the modification examples. The first female portion(s), if provided thereon with the female communication antenna(s) of any of the above-described aspects, may be embedded inside the female body by insert-molding or housed in a housing space of the female body, such that the female communication antenna(s) is located near one of the wall regions. The first female portion may be substantially parallel, inclined, or orthogonal relative to the any of the wall regions.

The second female circuit board of the invention may be omitted if, as described above, the female power-transmission/reception antenna(s) is provided on the second female portion of the first female circuit board, or if the female power-transmission/reception antennas are omitted. The second female circuit board of the invention may be disposed outside the female body of any of the embodiments and the modification examples and fixed to the female body. The second female circuit board(s) of the invention may be provided inside the female body of any of the embodiments and the modification examples. The second female circuit board, if provided thereon with the female power-reception/transmission antennas) of any of the above-described aspects, may be embedded inside the female body by insert-molding or housed in a housing space of the female body such that the female power-reception/transmission antenna(s) is located near another one of the wall regions, of any of the embodiments and the modification examples, other than the wall region, of any of the embodiments and the modification examples, near the female communication antenna. At least one second female circuit board will suffice for the invention.

The third female circuit board is not essential to the invention. The control unit of the female connector is not essential to the invention, either. The third female circuit board and/or the control unit may be disposed outside the female connector. In this case, the third female circuit board and/or the control unit may be connected via known connection means to the communication circuit, the power-reception circuit, and/or the power-transmission circuit as described. The control unit may be provided on a circuit board other than the third female circuit board inside the female body.

The first and second external connection means of the female connector are not essential to the invention. The female connector of the invention may further include a cable in place of the first and second external connection means. The cable may include communication lines and power lines. The communication lines and power lines protrude from one lengthwise end of the cable. The protruded communication lines may be connected to the communication circuit(s) via the first female circuit board of any of the above-described aspects, or connected to the control unit via a circuit board such as the third female circuit board. The protruded power lines may be connected to the power-reception circuit(s) or the power-transmission circuits) via the second female portion of the first female circuit board, the second female circuit board, or the third female circuit board of any of the above-described aspects.

The female connector of the invention may further include a shield case for covering the female body. The female connector of the invention may further include a shield member(s) to be disposed between the first female circuit board and the second female circuit board(s), between the first female circuit board and the third female circuit board, and/or between the second female circuit board(s) and the third female circuit board. The female connector of the invention may further include the female-side engaging portion as described above.

The connection structure of the invention may be any structure including the male connector of any of the above-described aspects and the female connector of any of the above-described aspects, and in the state (connected state) where the male connector is received and fixedly positioned in the connection hole of the female connector, the male communication antenna and the female communication antenna are arranged within a range such as to allow wireless communication of signals therebetween.

The connection structure of the invention in the connected state may be configured as follows: of the outer surface regions (outer surface regions of any of the above-described aspects) of the male connector, the outer surface region located near the male communication antenna (the male communication antenna of any of the above-described aspects) is opposed to the wall region (wall region of any of the above-described aspects) located near the female communication antenna (the female communication antenna of any of the above-described aspects) of the female connector, so that the male communication antenna and the female communication antenna are arranged within a range that allows wireless signal communication therebetween.

The connection structure of the invention in the connected state may be configured as follows: the outer surface region located near the male communication antenna of any of the above-described aspects is opposed to the wall region located near the female communication antenna of any of the above-described aspects; the male communication antenna located near the outer surface region and the female communication antenna located near the wall region are arranged within a range that allows wireless signal communication therebetween; and the male power-reception/transmission antenna of any of the above-described aspects and the female power-transmission/reception antenna of any of the above-described aspects are arranged within a range that allows wireless transfer of electric power therebetween.

Further, the connection structure of the invention in the connected state may be configured as follows: the outer surface region located near the male communication antenna of any of the above-described aspects is opposed to the wall region located near the female communication antenna of any of the above-described aspects; the male communication antenna located near the outer surface region and the female communication antenna located near the wall region are arranged within a range that allows wireless signal communication therebetween; the outer surface region located near the male power-reception/transmission antenna of any of the above-described aspects is opposed to the wall region located near the female power-transmission/reception antenna of any of the above-described aspects; and the male power-reception/transmission antenna located near the same outer surface region and the female power-transmission/reception antenna located near the same wall region are arranged within a range that allows wireless transfer of electric power therebetween.

In the case where the connection structure includes a plurality of male communication antennas and a plurality of female communication antennas as described above, the connection structure in the connected state of any of the embodiments and the modification examples, may be configured such that each male communication antenna and the associated female communication antenna are arranged within a range that allows wireless signal communication therebetween. In the case where the connection structure includes a plurality of male communication antennas and a plurality of female communication antennas, where the male communication antennas are each located near an outer surface region of the male body, and where the female communication antennas are each located near a wall region of the female body as described above, the connection structure in the connected state of any of the embodiments and the modification examples may be configured at least as follows: one of the outer surface regions located near at least one of the male communication antennas is opposed to one of the wall regions located near at least one of the female communication antennas, and another one of the outer surface regions located near another at least one of the male communication antennas is opposed to another one of the wall regions located near another at least one of the female communication antennas; and the above at least one of the male communication antenna and the above at least one of the female communication antenna are arranged within a range that allows wireless signal communication therebetween, and the above another at least one of the male communication antenna and the above another at least one of the female communication antenna are arranged within a range that allows wireless signal communication therebetween.

In the case where the connection structure includes a plurality of male power-reception/transmission antennas and a plurality of female power-transmission/reception antennas as described above, the connection structure in the connected state of any of the embodiments and the modification examples may be configured such that each male power-reception/transmission antenna and the associated female power-transmission/reception antenna are arranged within a range that allows wireless transfer of electric power therebetween. In the case where the connection structure includes a plurality of male power-reception/transmission antennas and a plurality of female power-transmission/reception antennas as described above, where each male power-reception/transmission antennas is located near an outer surface region of the male body, and where each female power-transmission/reception antennas is located near a wall region of the female body as described above, the connection structure in the connected state may be configured at least as follows: one of the outer surface regions located near at least one of the male power-reception/transmission antennas is opposed to one of the wall regions located near at least one of the female power-transmission/reception antennas, and another one of the outer surface regions located near another at least one of the power-reception/transmission antenna is opposed to another one of the wall regions located near another at least one of the female power-transmission/reception antennas; and the above at least one of the male power-reception/transmission antennas and the above at least one of the female power-transmission/reception antennas are arranged within a range that allows wireless transfer of electric power therebetween, and the above another at least one of the male power-reception/transmission antennas and the above another at least one of the female power-transmission/reception antennas are arranged within a range that allows wireless transfer of electric power therebetween. In any connected state as described above, the outer surface region located near each male communication antenna need not be opposed in parallel to the wall region located near the associated female communication antenna. In each connected state, each wall region may be opposed in parallel to each associated outer surface region.

It should be appreciated that the materials, shapes, dimensions, numbers, arrangements, and other configurations of the constituents of the male connector and the female connector may be modified in any manner if they can perform similar functions. The embodiments and modification examples may be combined with each other in any possible manner. The above-described communication modes are described by way of example only and may be modified in any manner that allows the male communication antenna of any of the above-described aspects can wirelessly communicate with the female communication antenna of any of the above-described aspects. The above-described charging modes are described by way of example only and may be modified in any manner that allows the male power-reception/transmission antenna of any of the above-described aspects and the female power-transmission/reception antenna of any of the above-described aspects to wirelessly transfer electric power therebetween. Some examples of the known connection means mentioned above are pins, conductors, and cables, etc.

REFERENCE SIGNS LIST

100a: male connector
110a: male body
111a: surface (outer surface region)
121a, 122a: male communication antenna
131a, 132a: communication circuit
140a: male power-reception antenna
150a: power-reception circuit
160a: control unit
171a: first male circuit board
172a: second male circuit board
173a: third male circuit board
100b: female connector
110b: female body
111b: connection hole
112b: wall (wall region)
121b, 122b: female communication antenna
131b, 132b: communication circuit
140b: female power-transmission antenna
150b: power-transmission circuit
160b: control unit -continued

```
171b: first female circuit board
172b: second female circuit board
173b: third female circuit board
100a': male connector
110a': male body
111a': first body
111a1': surface (outer surface region)
112a': second body
112a1': surface (outer surface region)
100b': female connector
110b': female body
111b': connection hole
111b1': first connection hole
111b2': second connection hole
112b1': wall (wall region)
112b2': wall (wall region)
200a: male connector
210a: male body
211a: surface
212a: outer surface region
221a, 222a: male communication antenna
230a: male power-reception antenna
240a: power-reception circuit
250a: control unit
261a: first male circuit board
262a: second male circuit board
263a: third male circuit board
200b: female connector
210b: female body
211b: connection hole
212b: wall
213b: wall region
221b, 222b: female communication antenna
230b: female power-transmission antenna
240b: power-transmission circuit
250b: control unit
261b: first female circuit board
262b: second female circuit board
263b: third female circuit board
```

The invention claimed is:

1. A male connector, comprising:
a male body in a shape of polyhedron including a plurality of outer surfaces not overlapping each other, the outer surfaces including a first outer surface and a second outer surface, the first and second outer surfaces being different surfaces from each other;
at least one first male communication antenna, each first male communication antenna of the at least one first male communication antenna being configured to wirelessly communicate a signal, provided near the first outer surface inside the male body and located, in its entirety, at a substantially same distance from the first outer surface; and
at least one first male power antenna, each first male power antenna of the at least one first male power antenna being a male power-reception antenna configured to wirelessly receive electric power or a male power-transmission antenna configured to wirelessly transmit electric power, provided near the second outer surface inside the male body, and located, in its entirety, at a substantially same distance from the second outer surface.

2. The male connector according to claim 1, wherein
the outer surfaces of the male body further comprise a fourth outer surface being a different surface from the first and second outer surfaces,
the male connector further comprises at least one second male power antenna, each second male power antenna of the at least one second male power antenna being a male power-reception antenna configured to wirelessly receive electric rower or a male power-transmission antenna configured to wirelessly transmit electric power, provided near the fourth outer surface inside the male body, and located, in its entirety, at a substantially same distance from the fourth outer surface.

3. The male connector according to claim 2, wherein the fourth outer surface is flat.

4. The male connector according to claim 1, further comprising a first male circuit board electrically connected to the at least one first male communication antenna.

5. The male connector according to claim 1, further comprising a first male circuit board electrically connected to the at least one first male communication antenna and the at least one first male power antenna.

6. The male connector according to claim 1, further comprising:
a first male circuit board electrically connected to the at least one first male communication antenna, and
a second male circuit board electrically connected to the at least one male first power antenna.

7. The male connector according to claim 1, wherein the first and second outer surfaces are flat.

8. A male connector, comprising:
a male body in a shape of polyhedron including a plurality of outer surfaces not overlapping each other, the outer surfaces including a first outer surface and a third outer surface, the first and third outer surfaces being different surfaces from each other;
at least one first male communication antenna, each first male communication antenna of the at least one first male communication antenna being configured to wirelessly communicate a signal, provided near the first outer surface inside the male body, and located, in its entirety, at a substantially same distance from the first outer surface; and
at least one second male communication antenna, each second male communication antenna of the at least one second male communication antenna being configured to wirelessly communicate a signal, provided near the third outer surface inside the male body, and located, in its entirety, at a substantially same distance from the third outer surface.

9. The male connector according to claim 8, wherein the first and third outer surfaces are flat.

10. A female connector, comprising:
a female body including a connection hole in a shape of polyhedron and a plurality of walls of the connection hole, the walls not overlapping each other and including a first wall and a second wall, the first and second walls being different walls from each other;
at least one first female communication antenna, each first female communication antenna of the at least one first female communication antenna being configured to wirelessly, communicate a signal, provided near the first wall inside the female body and located, in its entirety, at a substantially same distance from the first wall; and
at least one first female power antenna, each first female power antenna of the at least one first female power antenna being a female power-transmission antenna configured to wirelessly transmit electric power or a female power-reception antenna configured to wirelessly receive electric power, provided near the second wall inside the female body, and located, in its entirety, at a substantially same distance from the second wall.

11. The female connector according to claim 10, wherein the walls of the female body further comprise a fourth wall being a different wall from the first and second walls, the female connector further comprises at least one second female power antenna, each second female power antenna of the at least one second female power antenna being a female power-transmission antenna configured to wirelessly transmit electric power or a female power-reception antenna configured to wirelessly receive electric power, provided near the fourth wall inside the female body, and located, in its entirety, at a substantially same distance from the fourth wall.

12. The female connector according to claim 11, herein the fourth wall is flat.

13. The female connector according to claim 10, further comprising a first female circuit board electrically connected to the at least one first female communication antenna.

14. The female connector according to claim 10, further comprising a first female circuit board electrically connected to the at least one first female communication antenna and the at least one first female power antenna.

15. The female connector according to claim 10, further comprising:
a first female circuit board electrically connected to the at least one first female communication antenna, and
a second female circuit board electrically connected to the at least one first female power antenna.

16. The female connector according to claim 9, wherein the first and second walls are flat.

17. A female connector, comprising:
a female body including a connection hole in a shape of polyhedron and a plurality of walls of the connection hole, the walls not overlapping each other and including a first wall and a third wall, the first and third walls being different walls from each other;
at least one first female communication antenna, each first female communication antenna of the at least one first female communication antenna being configured to wirelessly communicate a signal, provided near the first wall inside the female body, and located, in its entirety, at a substantially same distance from the first wall; and
at least one second female communication antenna, each second female communication antenna of the at least one second female communication antenna being configured to wirelessly communicate a signal, provided near the third wall inside the female body, and located, in its entirety, at a substantially same distance from the third wall.

18. The female connector according to claim 17, wherein the first and third walls are flat.

19. A connection structure comprising a female connector and a male connector, wherein
the female connector includes:
a female body including a connection hole in a shape of polyhedron and a plurality of walls of the connection hole, the walls not overlapping each other and including a first wall and a second wall, the first and second walls being different walls from each other,
at least one first female communication antenna, each first female communication antenna of the at least one first female communication antenna being, configured to wirelessly communicate a signal, provided near the first wall inside the female body and located, in its entirety, at a substantially same distance from the first wall, and
at least one first female power antenna, each first female power antenna of the at least one first female power antenna being a female power-transmission antenna configured to wirelessly transmit electric power or a female power-reception antenna configured to wirelessly receive electric power, provided near the second wall inside the female body, and located, in its entirety, at a substantially same distance from the second wall,
the male connector includes:
a male body in a shape of polyhedron including a plurality of outer surfaces not overlapping each other, the outer surfaces including a first outer surface and a second surface, the first and second outer surfaces being different surfaces from each other,
at least one first male communication antenna, each first male communication antenna of the at least one first male communication antenna being configured to wirelessly communicate a signal, provided near the first outer surface inside the male body and located, in its entirety, at a substantially same distance from the first outer surface, and
at least one first male power antenna, each first male power antenna of the at least one first male power antenna being a male power-reception antenna configured to wirelessly receive electric power or a male power-transmission antenna configured to wirelessly transmit electric power, provided near the second outer surface inside the male body, and located, in its entirety, at a substantially same distance from the second outer surface,
when the male connector is received in the connection hole of the female connector so as to be fixed in position, the first outer surface is opposed to the first wall, each first male communication antenna of the at least one first male communication antenna and a corresponding one of the at least one first female communication antenna are arranged within a range that allows wireless signal communication therebetween, the second outer surface is opposed to the second wall, and each first male power antenna of the at least one first male power antenna and a corresponding one of the at least one female power antenna are arranged within a range that allows wireless transfer of electric power therebetween.

20. The connection structure according to claim 19, wherein
the walls of the female body further comprise a fourth wall being a different wall from the first and second walls,
the female connector further comprises at least one second female power antenna, each second female power antenna of the at least one second female power antenna being a female power-transmission antenna configured to wirelessly transmit electric power or a female power-reception antenna configured to wirelessly receive electric power, provided near the fourth wall inside the female body, and located, in its entirety, at a substantially same distance from the fourth wall,
the outer surfaces of the male body further comprise a fourth outer surface being a different surface from the first and second surfaces,
the male connector further comprises at least one second male power antenna, each second male power antenna of the at least one second male power antenna being a male power-reception antenna configured to wirelessly receive electric power or a male power-transmission antenna configured to wirelessly transmit electric power, provided near the fourth outer surface inside the male body, and located, in its entirety, at a substantially same distance from the fourth outer surface, and
when the male connector is received in the connection hole of the female connector so as to be fixed in position, the first outer surface is opposed to the first wall, each first male communication antenna of the at least one first male communication antenna and a corresponding one of the at least one first female communication antenna are arranged within a range that allows wireless signal communication therebetween, the second outer surface is opposed to the second wall, each first male power antenna of the at least one first male power antenna and a corresponding one of the at least one first female power antenna are arranged within a range that allows wireless transfer of electric power therebetween, the fourth outer surface is opposed to the fourth wall, and each second male power antenna of the at least one second male power antenna and a corresponding one of the at least one second female power antenna are arranged within a range that allows wireless transfer of electric power therebetween.

21. The connection structure according to claim 20, wherein
the fourth wall is flat, and
the fourth outer surface is flat.

22. The connection structure according to claim 19, wherein
the female connector further comprises a first female circuit board electrically connected to the at least one first female communication antenna, and
the male connector further comprises a first male circuit board electrically connected to the at least one first male communication antenna.

23. The connection structure according to claim 19, wherein
the female connector further comprises a first female circuit board electrically connected to the at least one first female communication antenna and the at least one first female power antenna, and
the male connector further comprises a first male circuit board electrically connected to the at least one first male communication antenna and the at least one first male power antenna.

24. The connection structure according to claim 19, wherein
the female connector further comprises:
a first female circuit board electrically connected to the at least one first female communication antenna, and
a second female circuit board electrically connected to the at least one first female power antenna, and
the male connector further comprises:
a first male circuit board electrically connected to the at least one first male communication antenna, and
a second male circuit board electrically connected to the at least one first male power antenna.

25. The connection structure according to claim 19, wherein
the first and second walls are flat, and
the first and second outer surfaces are flat.

26. A connection structure comprising a female connector and a male connector, wherein
the female connector includes:
a female body including a connection hole in a shape of polyhedron and a plurality of walls of the connection hole, the walls not overlapping each other and including a first wall and a third wall, the first and third walls being different walls from each other,
at least one first female communication antenna, each first female communication antenna of the at least one first female communication antenna being configured to wirelessly communicate a signal provided near the first wall inside the female body, and located, in its entirety, at a substantially same distance from the first wall, and
at least one second female communication antenna, each second female communication antenna of the at least one second female communication antenna being configured to wirelessly communicate a signal, provided near the third wall inside the female body, and located, in its entirety, at a substantially same distance from the third wall,
the male connector includes:
a male body in a shape of polyhedron including a plurality of outer surfaces not overlapping each other, the outer surfaces including a first outer surface and a third outer surface, the first and third outer surfaces being different surfaces from each other,
at least one first male communication antenna, each first male communication antenna of the at least one first male communication antenna being configured to wirelessly communicate a signal, provided near the first outer surface inside the male body, and located, in its entirety, at a substantially same distance from the first outer surface, and
at least one second male communication antenna, each second male communication antenna of the at least one second male communication antenna being configured to wirelessly communicate a signal, provided near the third outer surface inside the male body, and located, in its entirety, at a substantially same distance from the third outer surface, and
when the male connector is received in the connection hole of the female connector so as to be fixed in position, the first outer surface is opposed to the first wall, each first male communication antenna of the at least one first male communication antenna and a corresponding one of the at least one first female communication antenna are arranged within a range that allows wireless signal communication therebetween, the third outer surface is opposed to the third wall, and each second male communication antenna of the at least one second male communication antenna and a corresponding one of the at least one second female communication antenna are arranged within a range that allows wireless signal communication therebetween.

27. The connection structure according to claim 26, wherein
the first and third walls are flat, and
the first and third outer surfaces are flat.

* * * * *